(12) United States Patent  (10) Patent No.: US 8,395,522 B2
Kweon  (45) Date of Patent: Mar. 12, 2013

(54) INFORMATION DISPLAY APPARATUS AND METHOD THEREOF

(75) Inventor: Donguke Kweon, Seoul (KR)

(73) Assignee: LG Electronics, Inc., Seoul (KR)

( * ) Notice: Subject to any disclaimer, the term of this patent is extended or adjusted under 35 U.S.C. 154(b) by 386 days.

(21) Appl. No.: 12/859,824

(22) Filed: Aug. 20, 2010

(65) Prior Publication Data

US 2011/0187547 A1  Aug. 4, 2011

(30) Foreign Application Priority Data

Feb. 1, 2010 (KR) ......................... 10-2010-0009277

(51) Int. Cl.
  *G08B 21/00* (2006.01)
(52) U.S. Cl. ........ 340/670; 340/438; 340/458; 340/461; 340/467; 340/902; 340/904; 340/905; 455/441; 455/445; 455/567
(58) Field of Classification Search .................. 340/670, 340/438, 458, 461, 467, 902, 904, 905; 455/441, 455/445, 567
See application file for complete search history.

(56) References Cited

U.S. PATENT DOCUMENTS

| 5,635,920 | A | 6/1997 | Pogue et al. |
| 6,850,170 | B2 | 2/2005 | Neff |
| 7,375,650 | B2 | 5/2008 | Lo |
| 2005/0064913 | A1* | 3/2005 | Kim .............................. 455/567 |
| 2005/0237224 | A1 | 10/2005 | Gotfried |
| 2007/0142037 | A1 | 6/2007 | O Toole et al. |
| 2008/0211654 | A1 | 9/2008 | Kasamatsu |
| 2010/0279661 | A1* | 11/2010 | Furuta et al. ............... 455/412.2 |

FOREIGN PATENT DOCUMENTS

| JP | 2007-249478 A | 9/2007 |
| JP | WO 2009/064132 A2 | 5/2009 |
| KR | 10-20060020469 A | 3/2006 |
| KR | 10-0796714 B1 | 1/2008 |

OTHER PUBLICATIONS

PCT International Search Report and Written Opinion dated May 19, 2011 for Application No. PCT/KR2010/005309, 11 pages.

* cited by examiner

*Primary Examiner* — Tai T Nguyen
(74) *Attorney, Agent, or Firm* — Fish & Richardson P.C.

(57) ABSTRACT

Disclosed are an information display apparatus and a method thereof capable of allowing a user to conveniently and safely drive by displaying a sender's information corresponding to a call signal, on a windshield of a vehicle, through a display unit such as a Head-Up Display (HUD) or a projector, if the vehicle is in a running state when the call signal is received. The information display apparatus comprises a communication unit configured to receive a call signal, and a controller configured to detect a vehicle speed when the call signal is received, and configured to display a sender's information corresponding to the call signal, on a display unit, based on the vehicle speed.

21 Claims, 14 Drawing Sheets

INFORMATION DISPLAY APPARATUS AND METHOD THEREOF

CROSS-REFERENCE TO A RELATED APPLICATION

Pursuant to 35 U.S.C. §119(a), this application claims the benefit of earlier filing date and right of priority to Korean Application No. 10-2010-0009277, filed on Feb. 1, 2010, the content of which is incorporated by reference herein in its entirety.

BACKGROUND OF THE INVENTION

1. Field of the Invention

The present invention relates to an information display apparatus and a method thereof.

2. Description of the Related Art

An information display apparatus can serve to display various information through a mobile communication terminal, a navigation apparatus, etc. The mobile communication terminal can be disposed within a vehicle and the display information can be displayed by a heads up display (HUD) apparatus or a projector. The information displayed be associated with the vehicle or a user of the vehicle.

SUMMARY OF THE INVENTION

To achieve these and other advantages and in accordance with the purpose of the present invention, as embodied and broadly described herein, there is provided an information display apparatus, comprising: a communication unit configured to receive a call signal; and a controller configured to detect a vehicle speed when the call signal is received, and configured to display a sender's information corresponding to the call signal, on a display unit, based on the vehicle speed. The display unit may be a Head-Up Display (HUD) or a projector mounted to a dash board of a vehicle. The sender's information may include at least one of a sender's phone number, a sender's photo, and a sender's name.

When the call signal is received, the controller may display an icon indicating reception of the call signal on a windshield of the vehicle through the HUD or the projector. The controller may display the sender's information on the display unit when the vehicle is in a running state. The controller may detect the vehicle speed when a message is received, and display a sender's information corresponding to the message on the display unit based on the vehicle speed.

If the vehicle is in a running state when a message is received, the controller may display a sender's information corresponding to the message, and an icon indicating reception of the message, on the windshield of the vehicle through the HUD or the projector. When the vehicle is in a stopped state, the controller may display contents of a message received while the vehicle was running and/or a sender's information corresponding to the message, on the windshield of the vehicle through the HUD or the projector.

The controller may receive traffic light information when a message is received, and may display the message on the display unit based on the traffic light information. The controller may display contents of the message on the display unit when the traffic light information indicates a stop signal (i.e., a red light).

The controller may display contents of the message received when the traffic light information indicates a green light (go signal), on the display unit, when the traffic light information indicates a stop signal.

If the traffic light information indicates a go signal when the message is received, the controller may display, on the display unit, a sender's information corresponding to the message, and an icon indicating reception of the message.

If time taken for the traffic light to change to a go signal is longer than a predetermined time, the controller may display, on the display unit, contents of the message based on the traffic light information.

To achieve these and other advantages and in accordance with the purpose of the present invention, as embodied and broadly described herein, there is also provided a method for displaying information, the method comprising: receiving a call signal through a communication network; detecting a vehicle speed when the call signal is received; and displaying a sender's information corresponding to the call signal, on a display unit, based on the vehicle speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings. For the sake of brief description with reference to the drawings, the same or equivalent components will be provided with the same reference numbers, and description thereof will not be repeated.

Hereinafter, with reference to FIGS. 1 to 21, is presented an information display apparatus and a method of use thereof capable of allowing a driver to conveniently and safely drive a vehicle while receiving communication information, by displaying information relating to call information, a short message, an E-mail, etc. on a windshield of the vehicle, through a Head-Up Display (HUD) or a projector according to a speed of the vehicle (mobile terminal).

Figure 1:
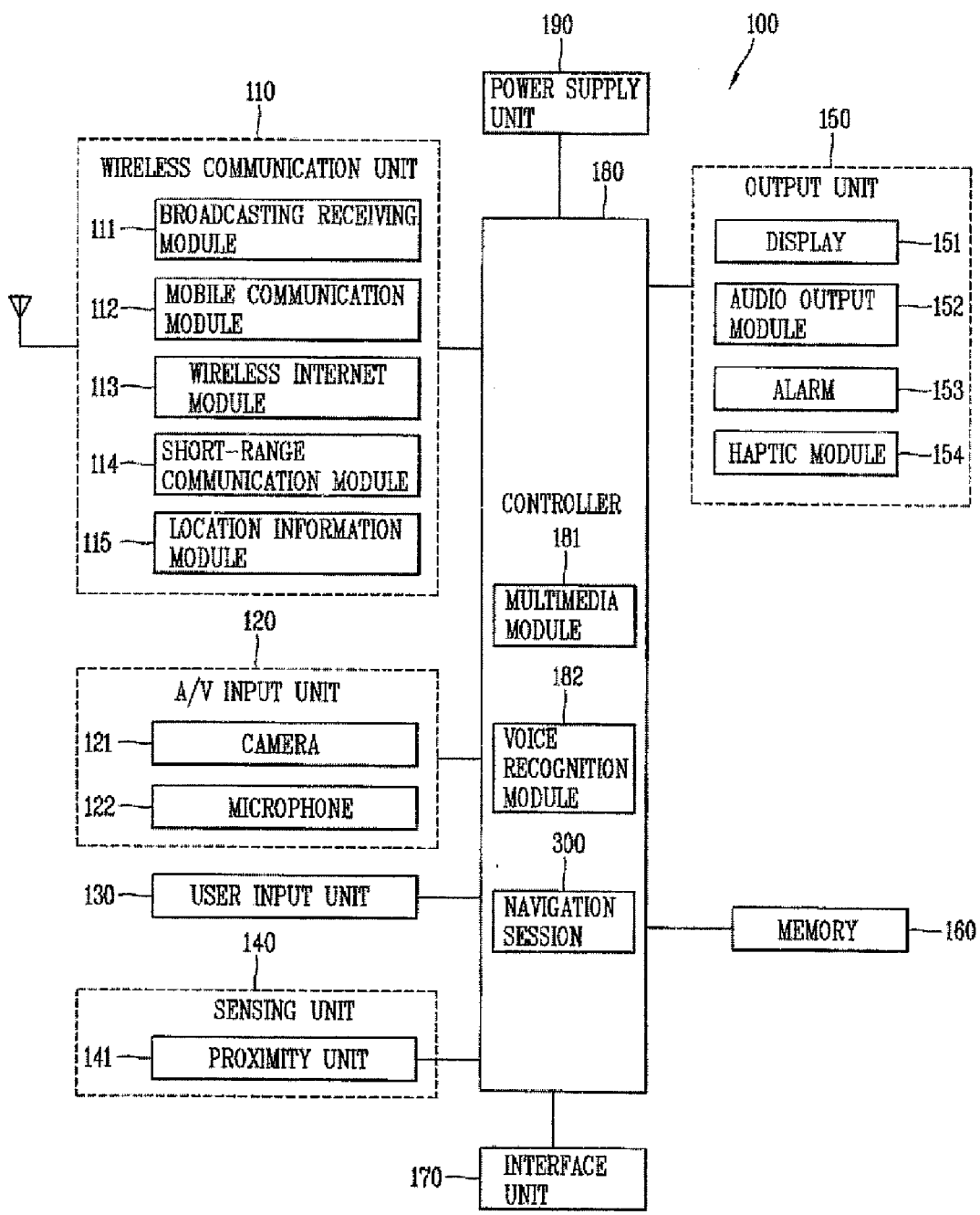
FIG. 1 is a block diagram illustrating a configuration of a mobile communication terminal to which an information display apparatus according to the present invention can be applied.

FIG. 1 illustrates an example configuration of a mobile communication terminal 100 employing an information display apparatus according to the present invention. The mobile communication terminal 100 may be implemented in various forms such as mobile phones, smart phones, notebook computers, digital broadcast terminals, PDAs (Personal Digital Assistants), PMPs (Portable Multimedia Player), etc.

As shown in FIG. 1, the mobile communication terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile communication terminal 100 having various components, but it is understood that implementing all of the illustrated components is not a requirement. The mobile communication terminal 100 may be implemented by greater or fewer components.

The wireless communication unit 110 typically includes one or more components allowing radio communication between the mobile communication terminal 100 and a wireless communication system or a network in which the mobile communication terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast signal may exist in various forms. For example, it may exist in the form of an electronic program guide (EPG) of a digital multimedia broadcasting (DMB) system, an electronic service guide (ESG) of a digital video broadcast-handheld (DVB-H) system, and the like.

The broadcast receiving module 111 may be configured to receive signals broadcast by using various types of broadcast systems. In particular, the broadcast receiving module 111 may receive a digital broadcast by using a digital broadcast system such as a multimedia broadcasting-terrestrial (DMB-T) system, a digital multimedia broadcasting-satellite (DMB-S) system, a digital video broadcast-handheld (DVB-H) system, a data broadcasting system such as media forward link only (MediaFLO®), integrated services digital broadcast-terrestrial (ISDB-T), etc. The broadcast receiving module 111 may be configured to be suitable for additional broadcast systems that provide a broadcast signal as well as the above-mentioned digital broadcast systems. Broadcast signals and/or broadcast-associated information received via the broadcast receiving module 111 may be stored in the memory 160 (or anther type of storage medium).

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile communication terminal 100. Wireless internet can be supported using one or more of the following: a wireless local area network (WLAN), Wi-Fi, wireless broadband (WiBro), world interoperability for microwave access (WiMAX), high speed downlink packet access (HSDPA), and the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location of the mobile communication terminal (when the mobile communication terminal is located in a vehicle, the location of the vehicle can be determined). For example, the location information module 115 may include a GPS (Global Positioning System) module that receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry based on the measured time and distances. A method of acquiring distance and time information from three satellites and performing error correction with a single satellite may be used. In particular, the GPS module may acquire an accurate time together with three-dimensional speed information as well as latitude, longitude and altitude values from the location information received from the satellites. As the location information module 115, a Wi-Fi location system and/or hybrid positioning system may be used.

The A/V input unit 120 is configured to receive an audio or video signal. The A/V input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile communication terminal.

The microphone 122 may receive sounds (audible data) via a microphone (or the like) in a phone call mode, a recording mode, a voice recognition mode, and the like, and can process such sounds into audio data. The processed audio (voice) data to may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile communication terminal 100 such as an opened or closed state of the mobile communication terminal 100, a location of the mobile communication terminal 100, the presence or absence of user contact with the mobile communication terminal 100 (e.g., touch inputs), the orientation of the mobile communication terminal 100, an acceleration or deceleration movement and direction of the mobile communication terminal 100, etc., and generates commands or signals for controlling the operation of the mobile communication terminal 100. For example, when the mobile communication terminal 100 is implemented as a slide type mobile phone, the sensing unit 140 may sense whether the slide phone is opened or closed. In addition, the sensing unit 140 can detect whether or not the power supply unit 190 supplies to power or whether or not the interface unit 170 is coupled with an external device.

The interface unit 170 (or other connection means) serves as an interface by which at least one external device may be connected with the mobile communication terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like. Here, the identification module may be a memory chip (or other element with memory or storage capabilities) that stores various information for authenticating a user's authority for using the mobile communication terminal 100 and may include a user identity module (UIM), a subscriber identity module (SIM) a universal subscriber identity module (USIM), and the like.

In addition, the device having the identification module (referred to as the 'identifying device', hereinafter) may take the form of a smart card. Accordingly, the identifying device may be connected with the terminal 100 via a port or other connection mechanisms. The interface unit 170 may be used to receive inputs (e.g., data, information, power, etc.) from an external device and transfer the received inputs to one or more elements within the mobile communication terminal 100 or may be used to transfer data between the mobile communication terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call or other communication (such as text messaging, multimedia file downloading, etc.). When the mobile communication terminal 100 is in a video call mode or image capturing mode, the display unit 151 may display a captured image and/or received image, a UI or GUI that shows videos or images and functions related thereto, and the like. When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

The mobile communication terminal 100 may include two or more display units (or other display devices). For example, the mobile communication terminal may include both an external display unit and an internal display unit.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may, for example, take the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area. When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

Hereinafter, a proximity sensor 141 of the mobile communication terminal will be explained with reference to FIG. 2.

Figure 2:
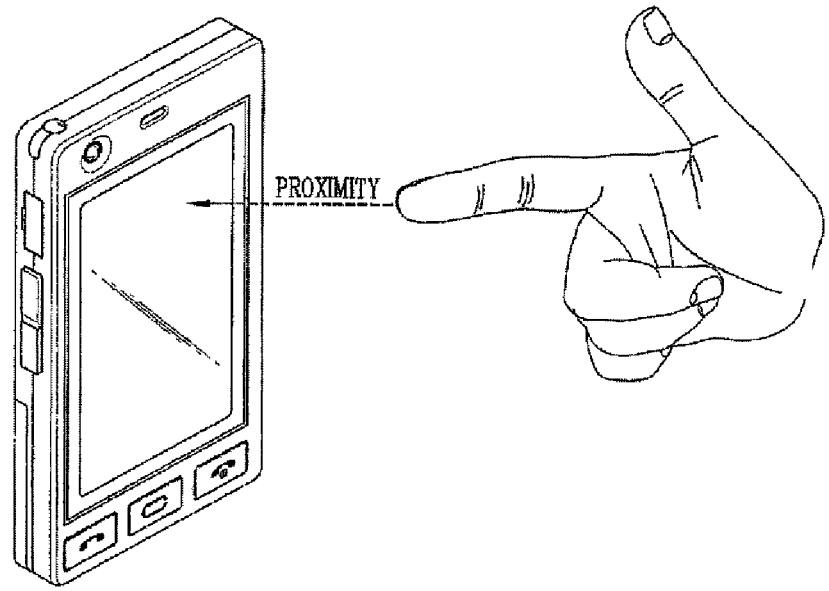
FIG. 2 is a view illustrating a proximity touch of the mobile communication terminal of FIG. 1.

FIG. 2 is a view illustrating proximity touch of the mobile communication terminal 100. Proximity touch refers to recognition of a pointer positioned to be close to the touch screen without being in contact with the touch screen.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The proximity sensor 141 may be, for example, a transmission type photo sensor, a direct reflection type photo sensor, a mirror-reflection type photo sensor, an RF oscillation type proximity sensor, a capacitance type proximity sensor, a magnetic proximity sensor, or an infrared proximity sensor. When the touch screen is an electrostatic type touch screen, an approach of the pointer is detected based on a to change in an electric field according to the approach of the pointer. In this case, the touch screen (touch sensor) may be classified as a proximity sensor.

Recognition of the pointer located to be close to the touch screen without being in contact with the touch screen will be called a 'proximity touch', while recognition of actual contacting of a pointer on the touch screen will be called a 'contact touch'. In this case, when the pointer is in the state of a proximity touch, it means that the pointer is located to correspond vertically to the touch screen.

The proximity sensor 141 may detect a proximity touch and a proximity touch pattern (e.g., a proximity touch distance, a proximity touch speed, a proximity touch time, a proximity touch location, a proximity touch movement state, or the like), and output information corresponding to the detected proximity touch operation and the proximity touch pattern to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile communication terminal 100 (e.g., a call signal reception sound, a message reception sound, other communication reception sounds, etc.). The audio output module 152 may include a speaker, a buzzer, or other sound generating device.

The alarm unit 153 (or other type of user notification devices) may provide outputs to inform about the occurrence of an event of the mobile communication terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events even if his mobile phone is in the user's pocket.

Outputs associated with the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted. Besides vibration, the haptic module 154 may generate various other tactile effects such as by stimulation using a pin arrangement vertically moving with respect to a contact skin, a spray force or suction force of air through a jet orifice or a suction opening, a contact on the skin, a contact of an electrode, electrostatic force, or an effect by reproducing the sense of cold and warmth using an element that can absorb or generate heat.

The haptic module 154 may be implemented to allow the user to feel a tactile effect through a muscle sensation such as fingers or arms of the user, as well as transferring the tactile effect through a direct contact. Two or more haptic modules 154 may be provided according to the configuration of the mobile communication terminal 100. For example, the haptic module 154 may be provided at a steering wheel, a gear shift lever, a car seat, and the like.

The memory 160 may store programs used for processing and controlling operations performed by the controller 180, or may temporarily store data (e.g., a phonebook, messages, still images, video, etc.) that is inputted or outputted. The memory 160 may include at least one type of storage medium including a Flash memory, a hard disk, a multimedia card micro type memory, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile communication terminal 100 may be operated in relation to a web storage device that performs the storage function of the memory 160 over the Internet.

The interface unit 170 serves as an interface with external devices connected with the mobile terminal 100. For example, the interface unit 170 may transmit data to an external device, receive and transmit power to elements of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating a user of the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port. The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile communication terminal 100 is connected with an external cradle, the interface unit 170 may serve as a conduit to allow power from the cradle to be supplied there through to the mobile communication terminal 100 or may serve as a conduit to allow various command signals inputted from the cradle to be transferred to the mobile communication terminal there through. Various command signals or power inputted from the cradle may operate as signals for recognizing when the mobile communication terminal is properly mounted on the cradle.

The controller 180 typically controls the general operations of the mobile communication terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180. The controller 180 may perform pattern recognition processing to recognize a handwriting input or a picture drawing input performed on the touch screen as characters or images.

The power supply unit 190 receives external power or internal power and supplies appropriate power required for operating respective elements and components under the control of the controller 180.

Processes described herein may be implemented in a computer-readable or to similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

A voice recognition module 182 may recognize a voice generated by the user and perform a corresponding function according to the recognized voice signal.

A navigation session 300 applied to the mobile communication terminal 100 can display travel route map data.

An information display apparatus applied to the mobile communication terminal 100 can include a wireless communication unit 110 configured to receive, through a wireless communication network, an incoming communication (e.g., an incoming call signal, a Short Message Service (SMS) message (i.e., text message), an e-mail, a voice mail, a video message, or other message), and a controller 180 configured to detect a speed of the mobile communication terminal 100 through the location information module 115 (e.g., a moving speed acquired by detecting time to taken to move 10 m based on a GPS signal), and configured to output, based on the moving speed, information relating to the incoming communication and the E-mail, to a Head-Up Display (HUD) or a projector mounted to a dashboard of a vehicle.

An example of an HUD (Head-Up Display) that may be used is disclosed in Korean Patent Publication No. 1996-0019039, US Patent Publication No. is U.S. Pat. No. 7,623,294, and US Patent Publication No. U.S. Pat. No. 7,532,175. An example of a projector that may be used is disclosed in Korean Patent Publication No. 10-2008-0021204, and Korean Patent Publication No. 10-2008-0090931. Accordingly, detailed descriptions about the HUD (Head-Up Display) or the projector will be omitted.

The HUD or the projector mounted to a dashboard of a vehicle displays information outputted from the controller 180, on the windshield of the vehicle. When the vehicle is in a stopped state or is less than a predetermined speed (e.g., a speed less than 30 km per hour), the controller 180 may output the information to the HUD or the projector. For example, when a moving speed of the mobile communication terminal 100 is zero or less than 30 km per hour, the controller 180 can attempt to communicate, through the short-range communication module 114, with a communication unit (not shown) included in the HUD or the projector.

In some implementations, the predetermined speed can be stored in the memory 160 and retrieved by the controller 180. In some implementations, the predetermined speed can be a set value (e.g., 30 km per hour, or 25 miles per hour). In some implementations, the predetermined speed can be set by the user of the vehicle. In some implementations, the predetermined speed can be determined by the controller based on one or more of speed limit information, traffic information, weather information, and temperature information. For example, the predetermined to speed can be set as the speed limit for the current location of the vehicle, or 5 km per hour below the speed limit for the current location of the vehicle. As another example, the predetermined speed can be set lower for heavy traffic conditions or inclement weather conditions than if traffic is not heavy and the weather is not inclement. In some implementations, the predetermined speed can be based on the temperature. For example, the predetermined speed can be lowered if the temperature is below freezing.

When a moving speed of the mobile communication terminal 100 is zero or less than a predetermined speed (e.g. 30 km per hour), if communication with a communication unit (not shown) included in the HUD or the projector is established using the short-range communication module 114, the controller 180 considers the mobile communication terminal 100 to be located in the vehicle, and considers a moving speed of the mobile communication terminal 100 to be equal to that of the vehicle.

On the other hand, when the moving speed of the mobile communication terminal 100 is zero or less than the predetermine speed, if communication with a communication unit (not shown) included in the HUD or the projector can not be established, the controller 180 considers the mobile communication terminal 100 not to be located in the vehicle, and may display the information only on the display unit 151.

If the incoming communication is received when a moving speed of the mobile communication terminal 100 is more than a predetermined speed (e.g., 30 km per hour), i.e., while the vehicle is running, the controller 180 displays an image corresponding to the incoming communication (e.g., a sender's photo stored in the memory 160 or another image associated with the caller) and/or a sender's phone number (or other contact information), on the windshield of the vehicle, through the HUD or the projector. In some implementations, the displayed information can be displayed on a monitor (e.g., LCD monitor) mounted in the vehicle or on a display is screen of a mobile device. Then, the controller 180 may transmit, to the sender of the incoming communication, a message indicating that the vehicle is currently in a moving state (e.g., "I'm driving now. I'll call you later.").

In some implementations, the sender can be any source that initiated the incoming communication. For example, the sender can be a person that initiated a phone call, a text message, or an e-mail. Information associated with the person can include a telephone number, an e-mail address, a screen name, a name, a user ID, an image (e.g., a photo of the person stored in the memory 160), or a sound (e.g., a audio clip stored in the memory 160). As another example, the sender can be a computer server that initiated an automatic communication, such as an e-mail, a text message, or a phone call. As another example, the sender can be a business, a charitable organization, a social organization, or other such entity.

In some implementations, the controller 180 can retrieve the message from the memory 160. In some implementations, the message can be pre-recorded by the driver of the vehicle or another user. In some implementations, the message can be a pre-stored message that is provided by a communications provider, or a device manufacturer. In some implementations, the message can be selected from a plurality of stored messages.

In some implementations, the controller 180 can provide the message if it is determined that the vehicle is in a moving (i.e., driving) state. For example, if the incoming communication is a phone call, the controller 180 can connect the phone call if the vehicle is in a stopped state. However, if it is identified that the vehicle is in a moving state, information associated with the phone call (e.g., caller's name, caller's phone number, picture of the caller) can be displayed by a HUD, a projector, or other display device. Alternatively, the information associated with the phone call can be audibly presented to the user by an audio device. Additionally, when it is identified that the vehicle is in a moving state, the response message can be sent to the sender (i.e., source) of the incoming communication. In some implementations, the response message can indicate to the sender that delivery of the communication has been interrupted because the driver of the vehicle is currently driving (i.e., the vehicle is in a moving state). In some implementations, the response message can indicate to the sender that delivery of the communication has been interrupted due to other factors, such as inclement weather, a remote or dangerous location of the vehicle, dense or difficult traffic conditions, or other driving conditions related to the location of the vehicle (e.g., the vehicle is currently in a mountainous area, or the road is abnormally curvy where the vehicle is presently located).

In some implementations, the incoming communication is only delivered (e.g., a call is connected, or a text message is displayed) when the vehicle is in a stopped state. If the vehicle is in a moving state, but below the predetermined speed, information associated with the incoming communication can be provided to the user using one or more visual displays. However, if the vehicle is in a moving state, and the speed of the vehicle is equal to or above the predetermined speed, information associated with the incoming communication can be communicated to the user audibly through an audio device (e.g., speaker).

If a short message is received while the mobile communication terminal 100 is moving, the controller 180 may display, through the HUD or the projector, the short message on the windshield of the vehicle when the moving speed of the mobile communication terminal 100 is zero (when the vehicle is in a stopped state).

Figure 3:
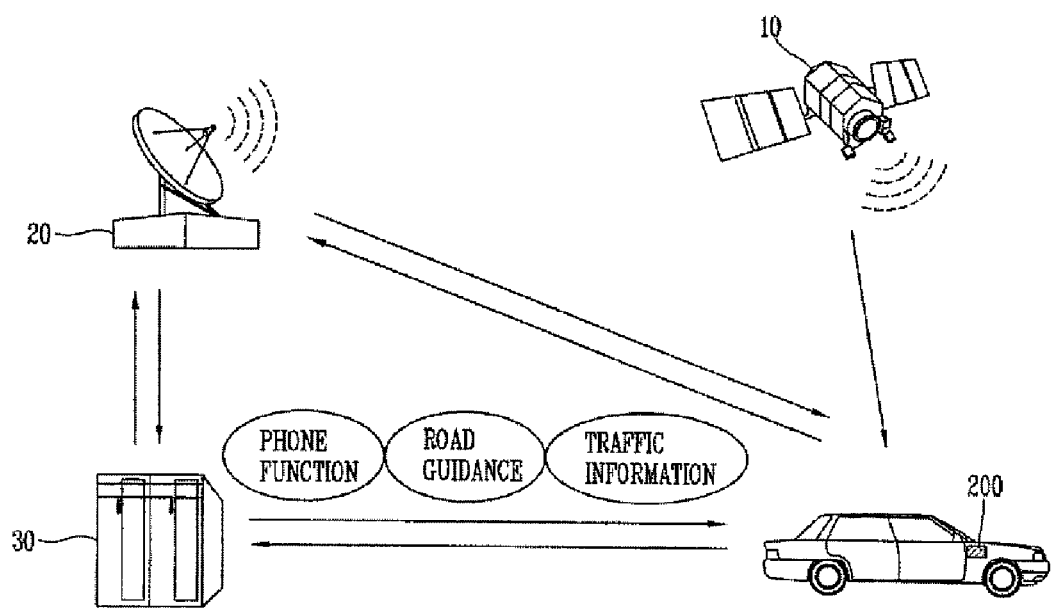
FIG. 3 is a block diagram illustrating a configuration of a vehicle navigation apparatus to which an information display apparatus according to the present invention can be applied.

FIG. 3 is a schematic block diagram showing a vehicle navigation system according to an exemplary embodiment of the present invention.

As shown in FIG. 3, the vehicle navigation system includes an information providing center 30 for providing traffic information and various data (e.g., programs, execution files, etc.); and a telematics terminal 200 that is mounted within a vehicle, receives traffic information via a remote wireless communication network 20 and/or short-range wireless communication network, and provides a road guidance service based on a GPS signal received via an artificial satellite 10 and the traffic information. Here, the communication network may further include a wireline/wireless communication network such as a local area network (LAN), or a wide area network (WAN).

Various traffic information (e.g., road traffic information, area information) including traffic light information are collected through the communication network, and the collected information is processed according to a transport protocol expert group (TPEG) standard in the information providing center 30 (e.g., a server). Accordingly, a broadcast station inserts traffic information including the traffic light information into a broadcast signal and broadcasts it to the vehicle 200. In some instances, the traffic light information may be received from a server (not shown) installed at a traffic light when the vehicle is near the traffic light.

The server can reconfigure a digital broadcast service that is communicated through various paths connected to a communication network, (for example, an operator input, a wireline/wireless Internet, a transparent data channel (TDC), a multimedia object transport (MOC), or various traffic information collected from a different server or a probe car) into a traffic information format such as a format in conformity with the TPEG standard, or a standard for a traffic information service, and transmits the same to the broadcast station.

The broadcast station can include the traffic information including the traffic light information which has been received from the server in a broadcast signal and transmits it wirelessly, so that a traffic information reception terminal, e.g., a navigation apparatus, mounted in the vehicle or the like can receive it. The traffic information includes the traffic light information and may include information regarding various traffic conditions such as an accident, a road condition, traffic congestion information, road construction information, road closure information, public traffic network delay information, or air transportation delay information.

The broadcast station receives the processed traffic information including the traffic light information from the server and transmits it to the vehicle through a digital signal in conformity with various digital broadcast standards. In this case, the broadcast standards may include various digital broadcast standards such as a Europe-oriented digital audio broadcasting (DAB) standard based on Eureca-147 [ETSI EN 300 401], a terrestrial or satellite digital multimedia broadcasting (DMB) standard, a terrestrial digital video broadcasting (DVB-T) standard, a digital video to broadcasting-handheld (DVB-H) standard, a media forward link only (MFLO) standard, and the like.

Also, the broadcast station may transmit the traffic information including the traffic light information via a wireline/wireless network such as through a wireline/wireless Internet connection.

The vehicle 200 refers to a carrier that can be implemented by using a mechanic and electronic device for the purpose of transporting people or objects such as general passenger cars, buses, trains, ships, aircraft, and the like.

The vehicle 200 includes the traffic information reception terminal mounted therein, receives the traffic light information from the broadcast station by using the mounted traffic information reception terminal, processes the traffic light information, and transmits the processed traffic light information via text and/or audio to a user.

The configuration of the telematics terminal 200 according to an exemplary embodiment of the present invention will now be described with reference to FIG. 4.

Figure 4:
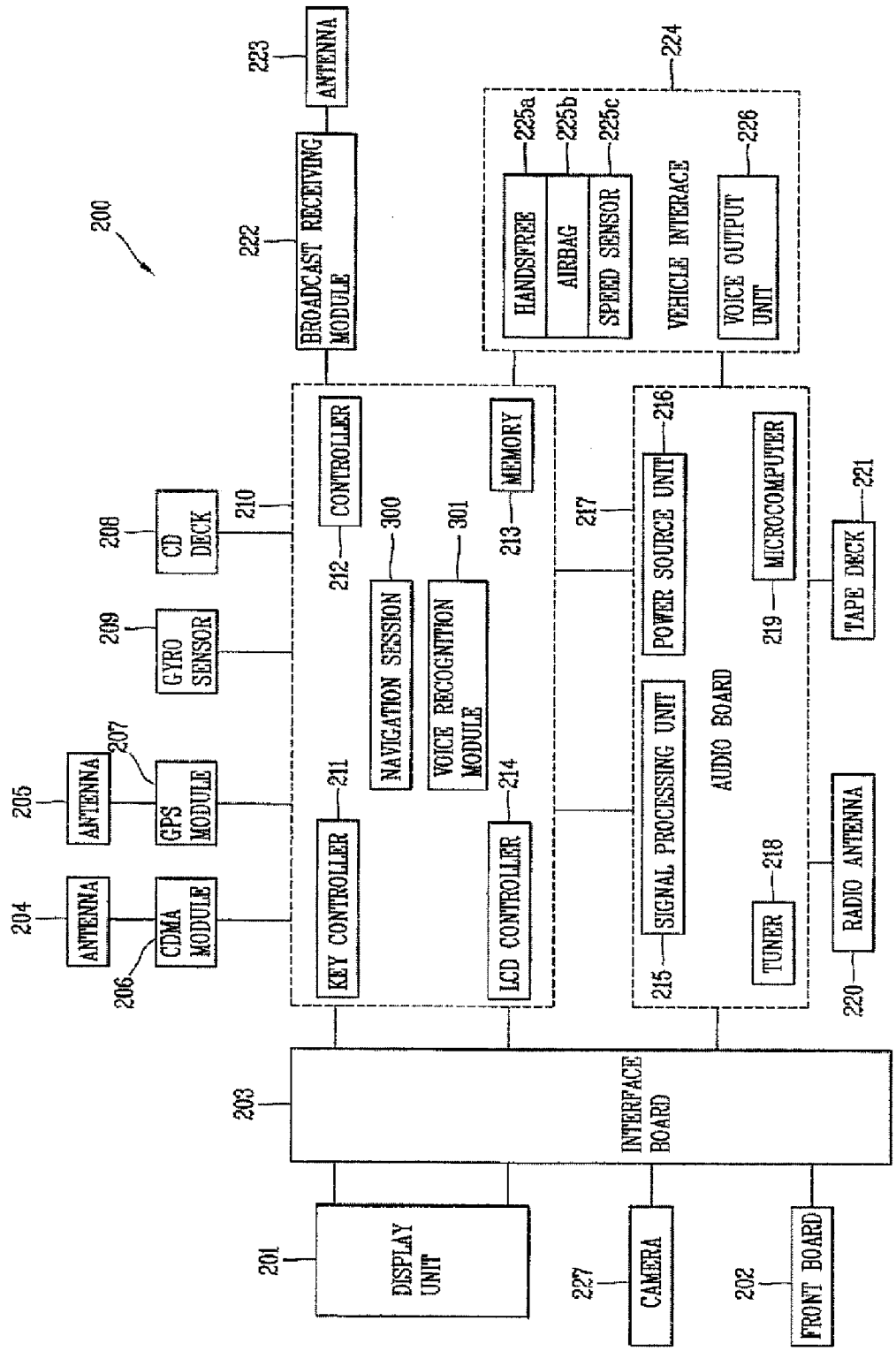
FIG. 4 is a block diagram illustrating a configuration of a telematics terminal to which an information display apparatus according to the present invention can be applied.

FIG. 4 is a schematic block diagram showing a telematics terminal 200 employing the vehicle navigation apparatus according to the present invention;

As shown in FIG. 4, the telematics terminal 200 includes a main board 210 including a CPU (Central Processing Unit) 212 for controlling the telematics terminal 200 overall, a memory 213 for storing various information, a key controller 211 for controlling various key signals, and an LCD controller 214 for controlling an LCD.

The memory 213 stores map information (map data) for displaying road guidance information on a digital map. The memory 213 can additionally store a traffic information collecting control algorithm for inputting traffic information according to the situation of a road along which the vehicle currently travels (runs), and information for controlling the algorithm.

The main board 210 includes a CDMA module 206, a mobile terminal having a unique device number as assigned and installed in the vehicle, a GPS module 207 for guiding a location of the vehicle, receiving a GPS signal for tracking a travel route from a start point to a destination, or transmitting traffic information collected by the user as a GPS signal, a CD deck 208 for reproducing a signal recorded in a CD (Compact Disk), a gyro sensor 209, or the like. The CDMA module 206 and the GPS module 207 receive signals via antennas 204 and 205.

A broadcast receiving module 222 is connected with the main board 210 and receives a TV signal via a TV antenna 223. A display unit (i.e., an LCD) 201 under the control of the LCD controller 214, a front board 202 under the control of the key controller 211, and a camera 227 for capturing the interior and/or the exterior of a vehicle are connected to the main board 210 via an interface board 203. The display unit 201 displays various video signals and character signals, and the front board 202 includes buttons for various key signal inputs and provides a key signal corresponding to a button selected by the user to the main board 210. In some instances, the display unit 201 can include a proximity sensor and a touch sensor (touch screen) of FIG. 2.

In some instances, the front board 202 includes a menu key for directly inputting traffic information. The menu key may be configured to be controlled by the key controller 211.

An audio board 217 is connected with the main board 210 and processes various audio signals. The audio board 217 includes a microcomputer 219 for controlling the audio board 217, a tuner 218 for receiving a radio signal, a power source unit 216 for supplying power to the microcomputer 219 and a signal processing unit 215 for processing various voice signals.

The audio board 217 can also include a radio antenna 220 for receiving a radio signal and a tape deck 221 for playing audio tapes. The audio board 217 may further include an amplifier 226 for outputting a voice signal processed by the audio board 217.

The amplifier 226 is connected to a vehicle interface 224. Namely, the audio board 217 and the main board 210 are connected to the vehicle interface 224. A handsfree module 225a for receiving a voice signal, an airbag 225b configured for the security of a passenger, a speed sensor 225c for detecting the speed of the vehicle, or the like, may be connected to the vehicle interface 224. The speed sensor 225c calculates a vehicle speed and provides the calculated vehicle speed information to the CPU 212.

The navigation session 300 applied to the telematics terminal 200 generates road guidance information based on the map data and current location information of the vehicle and provides the generated road guidance information to a user.

The display unit 201 can detect a proximity touch within a display window via a proximity sensor. For example, when a pointer (e.g., user's finger or stylus) is proximity-touched, the display unit 201 detects the position of the proximity touch and outputs position information corresponding to the detected position to the controller 212.

A voice recognition device (or a voice recognition module) 301 can recognize a voice pronounced by the user and performs a corresponding function according to the recognized voice signal.

The navigation session 300 applied to the telematics terminal displays a travel route using map data. When the mobile terminal 100 is located within a preset distance from a blind spot included in the travel route, the navigation session 300 can automatically wirelessly communicate with a terminal (e.g., a vehicle navigation apparatus) mounted in a nearby vehicle or a mobile communication terminal carried around by a nearby pedestrian via radio communication (e.g., a short-range wireless communication network) to receive location information of a nearby vehicle from the terminal mounted in the nearby vehicle and receive location information of the nearby pedestrian from the mobile communication terminal carried around by the nearby pedestrian.

The information display apparatus applied to the telematics terminal 200 includes a CDMA module 206 for receiving a incoming communication (e.g., a sender's incoming communication including a phone number and a Short Message Service (SMS) message) and an E-mail through a wireless communication network, and a controller 212 for detecting a vehicle speed through the GPS module 207, and for outputting information associated with the incoming communication (e.g., an incoming call signal, a Short Message Service (SMS) message (i.e., text message), an e-mail, a voice mail, a video message, or other message), to a Head-Up Display (HUD), a projector mounted to a dashboard of a vehicle, or another visual display (e.g., an LCD display mounted in the vehicle, or a display screen of a mobile device) based on the detected speed of the vehicle.

The Head-Up Display (HUD) or the projector mounted to the dashboard of the vehicle displays information outputted from the controller 212 on the windshield of the vehicle. When the vehicle is in a stopped state or maintains a predetermined speed (e.g., a speed less than 30 km per hour), the controller 212 may output the information to the HUD or the projector. For instance, when a moving speed of the vehicle or the telematics terminal 200 is zero or less than 30 km per hour, the controller 212 transmits the information to the HUD or the projector through a wire line (e.g., communication cable) or a short-range communication module (not shown).

If the incoming communication (including a sender's information) is received when a moving speed of the telematics terminal 200 is more than a predetermined speed (e.g., 30 km per hour), i.e., while the vehicle is running, the controller 180 displays an image corresponding to the incoming communication (e.g., a sender's photo stored in the memory 160) and/or a sender's contact information (e.g., a phone number, e-mail address, screen name, etc.), on the windshield of the vehicle, through the HUD or the projector. Then, the controller 180 may transmit, to the sender's mobile communication terminal, a pre-written message indicating that the vehicle is running (e.g., "I'm driving now. I'll call you later.").

If a short message is received while the vehicle is moving, the controller 180 may display, through the HUD or the projector, the short message on the windshield of the vehicle when the vehicle has achieved a stopped state.

Figure 5:
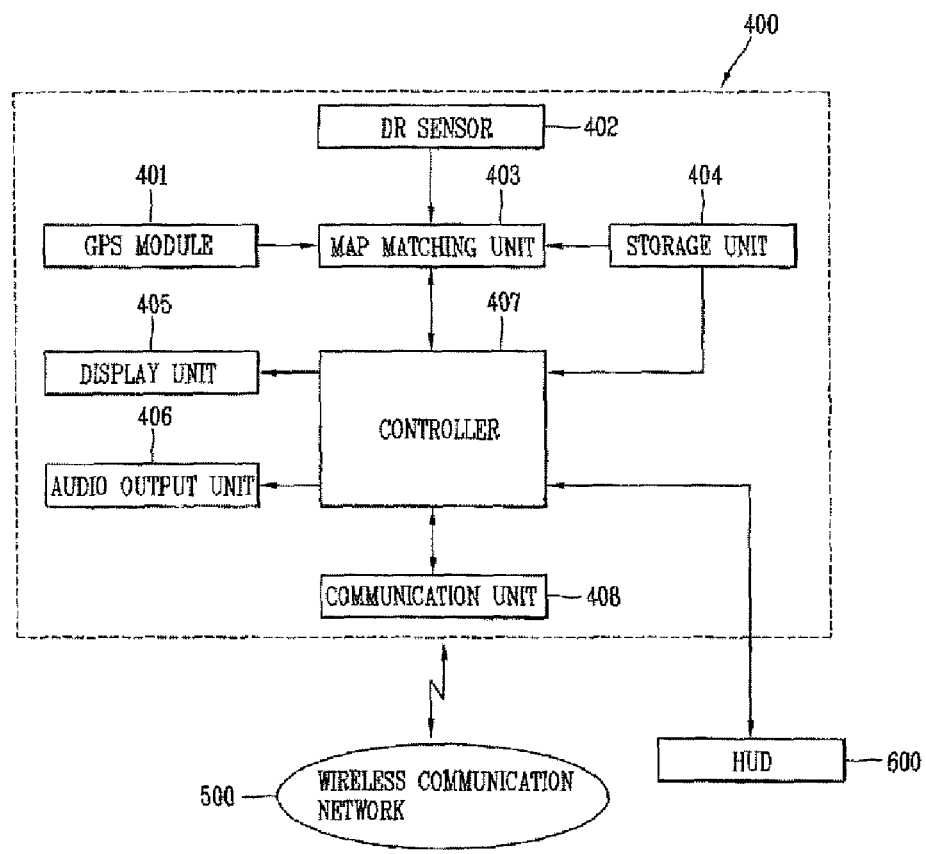
FIG. 5 is a block diagram illustrating a configuration of a navigation apparatus to which an information display apparatus according to the present invention can be is applied.

FIG. 5 is a schematic block diagram showing a configuration of the navigation apparatus 400 according to the first exemplary embodiment of the present invention.

The navigation (vehicle navigation) apparatus 400 is divided into an in-dash type navigation apparatus and an on-dash type navigation apparatus according to an installation form in the vehicle 200. The in-dash type navigation apparatus is inserted in a certain space allocated within a dash board and fixedly mounted. The on-dash type navigation apparatus is mounted on the dash board of the vehicle or installed by using a certain support near the dash board. The on-dash type navigation apparatus is detachably attached, so it can be separated from the vehicle and carried around.

The navigation apparatus 400 according to the present exemplary embodiment includes the in-dash type navigation apparatus and the on-dash type navigation apparatus. In addition, the navigation apparatus 400 according to the present exemplary embodiment may include any information processing device that can receive and/or process traffic information such as various portable terminals performing a navigation function by interworking with a GPS receiver that receives a navigation message transmitted from a GPS satellite within the vehicle.

As shown in FIG. 5, the navigation apparatus 400 includes a GPS module 401 for receiving a GPS signal from a satellite and generating first vehicle location data of the navigation apparatus (regarded as the same location as the telematics terminal 200 or the mobile communication terminal 100) based on the received GPS signal; a DR (Dead-Reckoning) sensor 402 for generating second vehicle location data based on a travel direction and the speed of a vehicle; a storage unit (or a memory) 404 for storing map data and various information; a map matching unit 403 for generating an estimated vehicle location based on the first and second vehicle location data, matching the generated estimated vehicle location and a link (map matching link or a map matching road) in the map data stored in the storage unit 404, and outputting the matched map information (map matching results); a communication unit 408 for receiving real time traffic information from an information providing center and/or a nearby vehicle via a wireless communication network 500, receiving traffic light information, and performing call communication; a controller 407 for generating road guidance information based on the matched map information (map matching results); a display unit 405 for displaying a road guidance map (including information about a point of interest (POI)) included in the road guidance information and the traffic light information; and a voice output unit 406 for outputting road guidance voice information (road guidance voice messages) included in the road guidance information and a voice signal corresponding to the traffic light information.

Here, the communication unit 408 may include a handsfree system having a Bluetooth module and may receive a broadcast signal including traffic information in a TPEG format via an antenna from a broadcast station.

The information display apparatus applied to the navigation apparatus 400 includes a communication unit 408 for receiving an incoming communication (e.g., a an incoming call signal, a Short Message Service (SMS) message (i.e., text message), an e-mail, a voice mail, a video message, or other message) through a wireless communication network 500, and a controller 407 for detecting a vehicle speed through the GPS module 401, and for outputting information on the call signal to a Head-Up Display (HUD) 600, a projector mounted to a dashboard of a vehicle, or other display device based on the detected vehicle speed.

The Head-Up Display (HUD) or the projector mounted to the dashboard of the vehicle displays information outputted from the controller 407 on the windshield of the vehicle. When the vehicle is in a stopped state or maintains a predetermined speed (e.g., a speed less than 30 km per hour), the controller 407 may output the to information to the HUD or the projector. For instance, when a moving speed of the vehicle or the navigation apparatus 400 is zero or less than 30 km per hour, the controller 407 transmits the information to the HUD or the projector through a wire line (e.g., communication cable) or a short-range communication module (not shown).

If the incoming communication (including a sender's information) is received when a moving speed of the navigation apparatus 400 is more than a predetermined speed (e.g., 30 km per hour), i.e., while the vehicle is running, the controller 407 displays an image corresponding to the incoming communication (e.g., a sender's photo stored in the memory 160), the sender's name, the sender's phone number, and/or other information associated with the incoming communication or the sender, on the windshield of the vehicle, through the HUD 600 or the projector. Then, the controller 407 may transmit, to the sender's mobile communication terminal, a pre-written message indicating that the vehicle is running (e.g., "I'm driving now. I'll call you later.").

If a short message is received while the vehicle is moving, the controller 407 may display, through the HUD 600 or the projector, the short message on the windshield of the vehicle when the vehicle is in a stopped state.

The communication unit 408 may further include a handsfree system having a Bluetooth module, and may receive a broadcast signal including traffic information of a TPEG format through an antenna from a broadcasting station. The broadcast signal can include video and audio data according to one or more standards, such as a terrestrial or satellite digital multimedia broadcasting (DMB) standard, a digital audio broadcasting (DAB) standard, and a digital video broadcasting standard. The broadcast signal can additionally include information such as traffic information and supplementary data according to a traffic information (TPEG) service or a Binary Format for Scene (BIFS) data service. Also, the communication unit 408 can tune a signal band providing traffic information, and demodulate the tuned signal to output it to a TPEG decoder included in the controller 407.

The TPEG decoder decodes the traffic information of a TPEG format, and provides the information, such as traffic light information included in the traffic information, to the controller 407.

The road guidance information may include not only map data, but also information relating to driving (traveling), such as lane information, speed limit information, turn-by-turn direction information, traffic safety information, traffic guidance information, vehicle information, and road search information.

The signal received via the GPS module 401 may be configured to provide the location information of the terminal to the navigation apparatus 400 by using a wireless communication scheme such as 802.11, a standard of the wireless network for WLAN including wireless LAN, some infrared communication, and the like, 802.15, a standard for a wireless personal area network (PAN) including Bluetooth™, UWB, ZigBee, and the like, 802.16, a standard for a wireless metropolitan area network (MAN) broadband wireless access (BWA) including a fixed wireless access (FWA), and the like, and 802.20, a standard for the mobile Internet with respect to a mobile broadband wireless access (MBWA) including WiBro, WiMAX, and the like, proposed by IEEE (Institute of Electrical and Electronics Engineers).

The navigation apparatus 400 may further include an input unit. The input unit may be used to select a user-desired function or receive information The input unit can take the form of one or more various devices such as a keypad, a touch screen, a jog shuttle, a microphone, and the like.

The map matching unit 403 generates a vehicle estimated location based on the first and second vehicle location data, and reads map data corresponding to a travel route from the storage unit 404.

The map matching unit 403 matches the vehicle estimated location and a link (road) included in the map data, and outputs the matched map information (map matching results) to the controller 407. For example, the map matching unit 403 generates the vehicle estimated location based on the first and second location data, matches the generated vehicle estimated location and links in the map data stored in the storage unit 404 according to the link order, and outputs the matched map information (map matching results) to the controller 407. The map matching unit 403 may output information regarding road attributes such as one-storied road, duplex-storied road, and the like, included in the matched map information (map matching results). The function of the map matching unit 403 may be implemented in the controller 407.

The storage unit 404 stores map data. In this case, the stored map data can include geographic coordinates (or longitude/latitude coordinates) representing the latitude and longitude by DMS (Degree/Minute/Second) unit. Here, besides the geographic coordinates, universal transverse mercator (UTM) coordinates, universal polar system (UPS) coordinates, transverse mercator (TM) coordinates, and the like, may be included in the stored map data.

The storage unit 404 stores various information such as various menu screen images, point of interest (POI) information, function characteristics information according to a particular position of map data, and the like. The storage unit 404 stores various user interfaces (UIs) and/or graphic UIs (GUIs). The storage unit 404 stores data and programs required for operating the navigation apparatus 400. The storage unit 404 stores destination information inputted from the user via the input unit. In this case, the destination information may be a destination or one of a destination and a start point.

The display unit 405 displays image information (or a road guidance map) included in the road guidance information generated by the controller 407. Here, the display unit 405 includes a touch sensor (touch screen) and/or a proximity sensor. The road guidance information may include information associated with traveling (running, driving) such as lane information, speed limit information, turn-by-turn direction information, traffic safety information, traffic guidance information, vehicle information, road search information, and the like, as well as the map data.

When displaying the image information, the display unit 405 may display various contents such as various menu screen images, road guidance information, and the like, by using a user interface and/or a graphic user interface included in the storage unit 404. Here, the contents displayed on the display unit 405 may include various text or image data (including map data or various information data), and a menu screen image including data such as icons, list menus, combo boxes, and the like.

The voice output unit 406 outputs voice information included in road guidance information (or a voice message with respect to the road guidance information) generated by the controller 407. Here, the voice output unit 406 may be an amplifier or a speaker.

The controller 407 generates the road guidance information based on the matched map information and outputs the generated road guidance information to the display unit 405 and the voice output unit 406. The controller 407 receives real time traffic information from the information providing center and generates road guidance information. The controller 407 may be connected to a call center via the communication unit 408 to perform call communication, or transmit or receive information between the navigation apparatus 400 and the call center. Here, the communication unit 408 may include a handsfree module having a Bluetooth™ function using a short-range radio communication scheme.

When a POI search menu is selected by the user, the controller 407 searches a POI located in a route from the current location to a destination, and displays the searched Poi on the display unit 405. In this case, the controller 407 searches a POI (namely, a point at which the route does not need to change, e.g., a POI positioned at left or right side of the traveling road) positioned on the route and/or a POI (namely, a point at which the route needs to change, e.g., a point at which the pre-set route needs to change in order to go through a nearby POI) positioned near the route, and displays the searched POI on the display unit 405. In some implementations, the searched POI can be identified in response to a user input. For example, a gas station can be identified as a POI in response to a user entered query of "gas."

Hereinafter, the format of the TPEG information will now be described with reference to FIG. 6.

Figure 6:
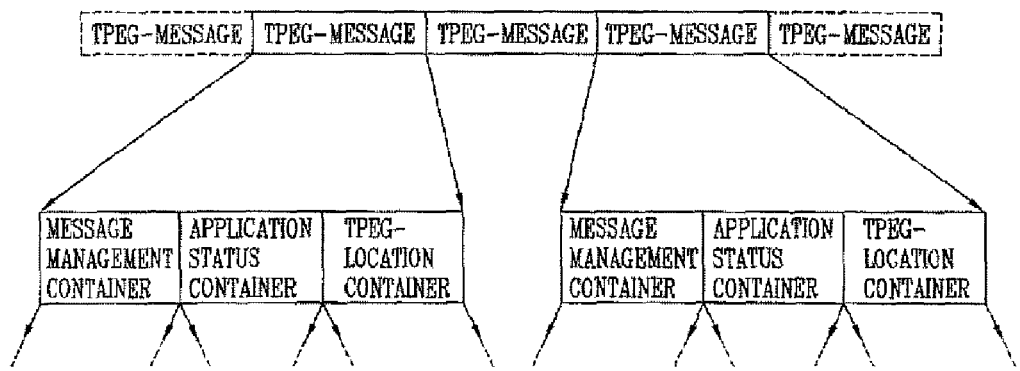
FIG. 6 is a view illustrating a format of TPEG information.

FIG. 6 illustrates the format of TPEG information according to an exemplary to embodiment of the present invention.

With reference to FIG. 6, the TPEG information includes a sequence of message segments (referred to as a 'TPEG message', hereinafter).

Each of the message segments may be applied to different applications. For example, each TPEG message may be applied to one of a TPEG-congestion and travel-time information application, a TPEG-road traffic message application, a TPEG-public transport information application, a TPEG-multimedia based traffic and travel information application, and other applications. In the present exemplary embodiment, traffic light information may be applied to any of the above-mentioned applications.

A unique identification number called an application identification (AID) is assigned to each of the TPEG applications. The AID is used to decode a received TPEG message by using the most appropriate application decoder.

An AID 0001(hex) is assigned to the TPEG-road traffic message application, an AID 0010(hex) is assigned to the TPEG-congestion and travel-time information application (TPEG-CTT), and an AID 0008(hex) is assigned to the TPEG-multimedia based traffic and travel information application.

The TPEG message includes a message management container, an application status container, and a TPEG location container.

Content of the application status container varies depending on the types of the TPEG message applications. The traffic light information according to the present exemplary embodiment may be included in the application status container and transmitted. For example, when the TPEG message is a TPEG congestion and travel-time information application (TPEG-CTT), the traffic light information may be included in the TPEG-CTT container or the application status container. In this case, the TPEG-CTT container may include congestion and travel time status information, congestion and travel time status prediction information, additional information, and the traffic light information according to the present exemplary embodiment of the present invention.

The congestion and travel time status information includes information regarding an average road segment speed, a travel time, a road segment delay, and a congestion type. The congestion and travel time status prediction information includes information regarding an average speed prediction, a travel time prediction, and a congestion tendency. The additional information describes supplementary information, auxiliary information, and the like, related to the congestion and travel time status information, in a text format.

The traffic light information includes information regarding a traffic light number, a traffic light period, a signal of a traffic light at a time point at which the traffic light information was acquired, a lapse time duration from a time point at which a signal of the traffic light was changed to a time point at which the traffic light information was acquired, supplementary information, and the time point at which the traffic light information is acquired. This will be described in detail later with reference to FIG. 7. The TPEG location container includes location information regarding each link, namely, each road segment. In some implementations, messages transmitted by being included in the TPEG information are location-dependent and include information regarding a location.

Figure 7:
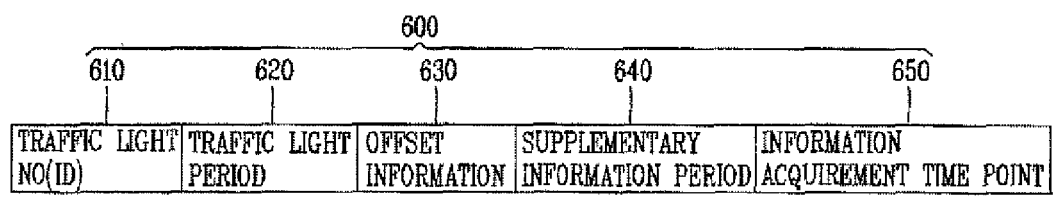
FIG. 7 is a view illustrating traffic light information transmitted by being included in an application status container of FIG. 6.

FIG. 7 illustrates traffic light information which is included in the application status container of FIG. 6 so as to be transmitted.

With reference to FIG. 7, the traffic light information 600 includes a traffic light. No. (ID) 610, a traffic light period 620, offset information 630, supplementary information 640, and an information acquirement time point 650.

The traffic light number 610 indicates an ID a traffic light included in each road section. In the TPEG, a link ID is assigned to each road section, and the traffic light ID may be assigned in association with the link ID. For example, when three different traffic lights are included in a road section with a link ID '100', each traffic light number may be defined as 100a, 100b, and 100c. This is merely an example, and the traffic light numbers may be defined in a different manner.

The traffic light period 620 indicates a time duration during which a traffic light maintains a current state. For example, when a traffic light includes three signals of a green traffic light, a yellow traffic light, and a red traffic light, the period of the green traffic light may be one minute, that of the yellow traffic light may be 5 seconds, and that of the red traffic light may be 30 seconds. Namely, when the time duration of one minute lapses from the time point at which the traffic light was changed to the green traffic light, the green traffic light is changed to the yellow traffic light, and when five seconds lapses from the point at which the green traffic light was changed to the yellow traffic light, the signal may change from the yellow traffic light to the red traffic light.

The offset information 630 includes information regarding a signal of a traffic light at the time point at which the traffic light information was acquired and a lapse time duration from a time point at which a signal of the traffic light was changed to a time point at which the traffic light information was acquired. For example, the offset information 630 may include information that a traffic light is currently a red signal and information that 30 seconds has lapsed after the traffic light was changed to the red signal.

The supplementary information 640 includes information about whether or not the traffic light is turned on or off, whether the traffic light is in disorder, or whether or not a reversible lane can be used. In some implementations, the supplementary information 640 can include information on turn signals, walk signals and other signals associated with a traffic light.

The information acquirement time point 650 information regarding a time point at which the current traffic light number 610, the traffic light period 620, the offset information, and the supplementary information 640 were acquired. In some implementations, the traffic light information 600 can include additional information, such as location information for the traffic light.

Hereinafter, a method for providing traffic light information will be explained in more detail with reference to FIGS. 5 to 8.

Figure 8:
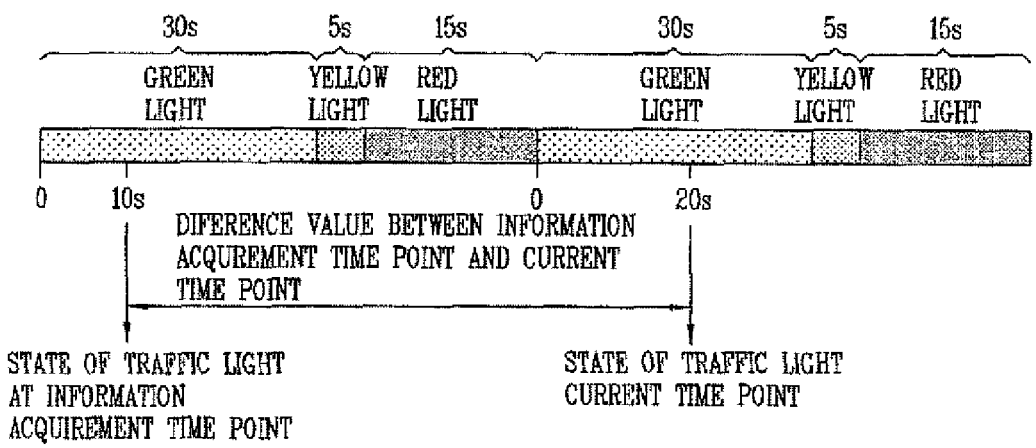
FIG. 8 is a view illustrating an example of acquiring traffic light information at a current time point.

As shown in FIG. 8, the communication unit 408 receives a broadcast signal including traffic light information from a broadcast station. The broadcast signal includes the TPEG message. The traffic light information may be included in the application status container of the TPEG message. The communication unit 408 may receive traffic information and/or the broadcast signal including the traffic light information via a vehicle sensor (not shown) installed on the road.

The TPEG decoder decodes the TPEG message included in the broadcast signal to extract the traffic light information and various traffic information included in the TPEG message. The traffic light information includes the information regarding a time point at which the traffic light number, the traffic light period, the offset information, the supplementary information were acquired.

The controller 407 calculates a difference value between the time point at which the traffic light information was acquired and a current time. The controller 407 identifies traffic light information of the current time point based on the calculated difference value and the traffic light information at the information acquirement time point.

FIG. 8 illustrates an example of acquiring traffic light information at a current time point.

In the example shown in FIG. 8, it is assumed that the period of the green traffic light is 30 [s], the period of the yellow traffic light is 5 [s], and the period of the red traffic light is 15 [s]. Such period information may be indicated by the traffic light period 620. The state of the traffic light at the information acquirement time point is a state in which 10 seconds has lapsed since the traffic light was changed to the green traffic light. This information may be indicated by the offset information 630. In the example, when the difference value between the calculated information acquirement time point and the current time is 60 [sec], the state of the traffic light at the current time point is a state in which 20 seconds has lapsed since the traffic light was changed to the green traffic light. Namely, the state of the traffic light at the current time point can be determined by delaying time by the calculated difference value between the information acquirement time point and the current time point.

In this manner, when the traffic light information at the current time point is determined, the controller 407 controls the display unit 405 to display the traffic light information at the current time point.

Figure 9:
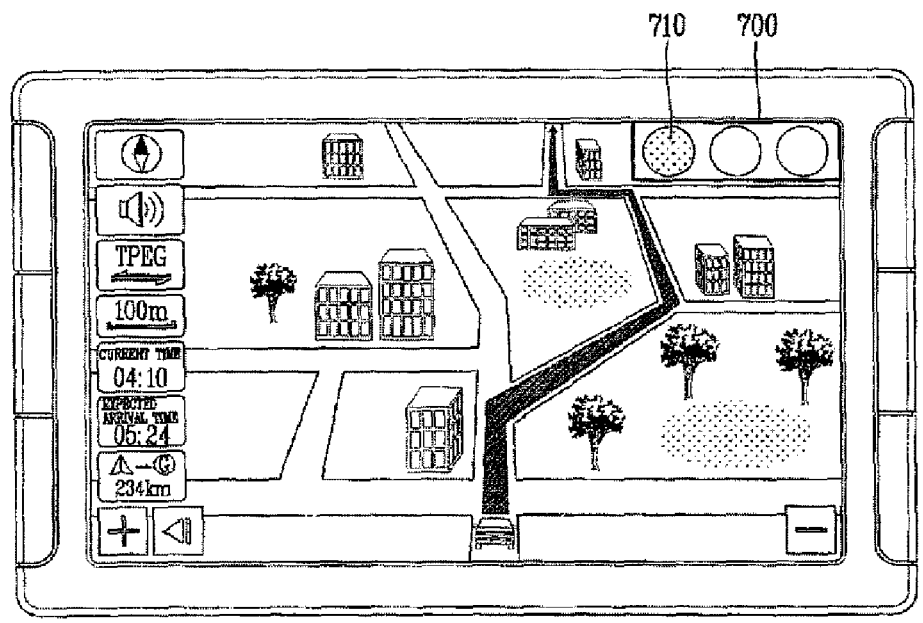
FIGS. 9 and 10 are views illustrating examples of displaying traffic light information on a display unit.
Figure 10:
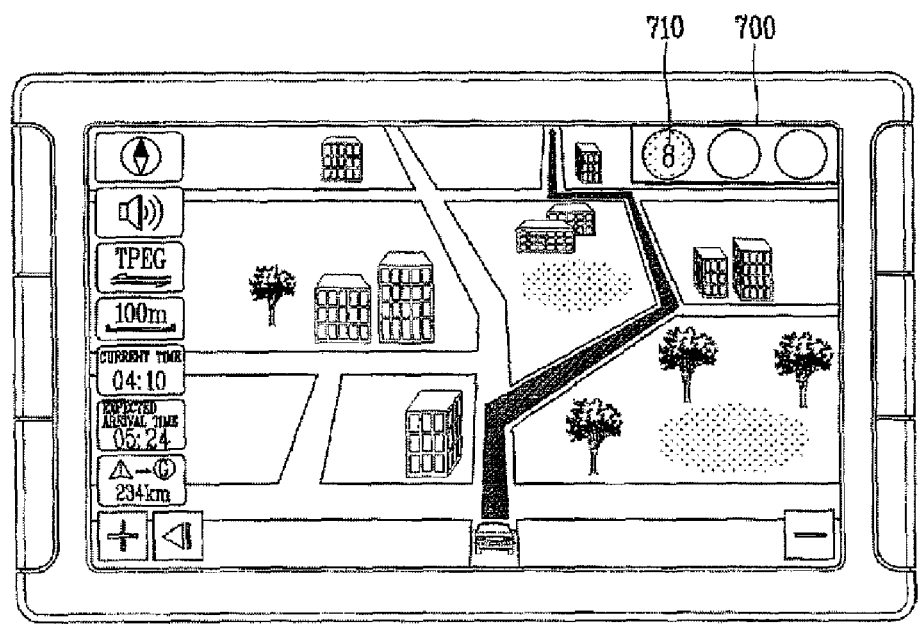

FIGS. 9 and 10 illustrate examples of displaying the traffic light information on the display unit according to an exemplary embodiment of the present invention.

As shown in FIG. 9, the controller 407 displays information 700 of the traffic light that a vehicle will reach in the road section in which the vehicle is currently located at an upper end of the right portion of the display unit 405. Because the signal of the traffic light 710 is currently red, a driver should wait until the signal is changed to a green traffic light before proceeding through the intersection.

As shown in FIG. 10, a count number indicating time information to indicate the amount of time before the current signal will change may be displayed in addition to the traffic light information 700. For example, the signal of the red traffic light 710 is turned on and a count number '8' is indicated within the red traffic light. This means that the signal of the red traffic light 710 will change to a different signal in eight seconds. The count number diminishes by 1 at every second and becomes 0 at the time point when the signal is changed. Namely, through the count number, the user (i.e., the driver) can easily check the time point at which the signal will change, and quickly cope with the change in the signal.

Hereinafter, will be explained a vehicle navigation method using traffic light information according to the present invention.

First, the communication unit 408 acquires traffic light information and uses the acquired traffic light information to determine a traffic light state at a current time point.

The controller 407 checks whether or not the vehicle is currently driving or in a stop state. Here, whether or not the vehicle is driving or in a stop state may be checked from GPS data inputted via the GPS module 401 or data inputted from a wheel speed sensor (not shown) that provides average speed information of a vehicle.

When the vehicle is currently driving, the controller 407 calculates a time duration t1 required for the vehicle to reach the traffic light from the current time point, and calculates a time duration t2 required for the signal of the current traffic light to change to a different signal from the current time point. Here, the time duration t1 required for the vehicle to reach the traffic light may be calculated by using an average speed of the vehicle, an average road segment speed, a travel time, and the like. The average speed of the vehicle may be checked from data provided from the wheel speed sensor (not shown), and the average road segment speed or the travel time may be checked from the congestion and travel time status information included in the TEPG-CTT container.

The controller 407 determines whether or not the time duration t2 during which the signal of the current traffic light is changed to a different signal is larger than the time duration t1 taken for the vehicle to reach the traffic light. If the time duration t2 before which the signal of the current traffic light is changed to a red or yellow signal is larger than the time duration t1 taken for the vehicle to reach the traffic light, the controller 407 determines that the vehicle can safely pass through the traffic light at the current travel speed. The controller 407 can generate an intersection entry safe message, and output the intersection entry safe message to the display unit 405 and/or to the voice output unit 406. Here, the current traffic light refers to a traffic light along a route from the current location to a destination.

Meanwhile, if the time duration t2 is smaller than the time duration t1 taken for the vehicle to reach the traffic light, the controller 407 outputs a guidance voice regarding a signal change time point via the voice output unit 406. Namely, the controller 407 determines that the vehicle cannot safely pass through the traffic light and outputs a guidance voice regarding a signal change at a certain time point before the signal of the traffic light is changed (e.g., "light will change to yellow in four seconds").

Figure 11:
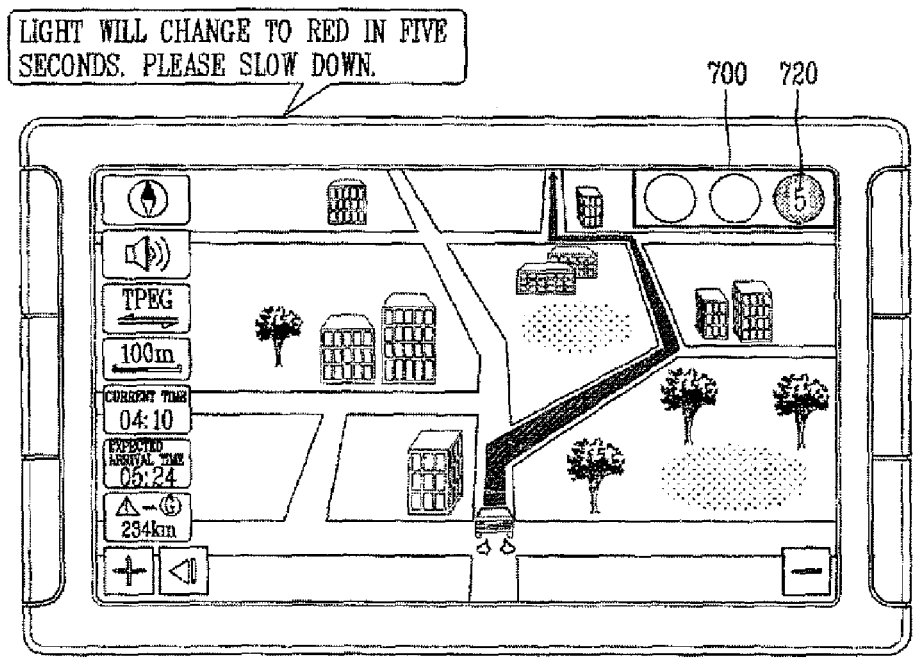
FIG. 11 shows an exemplary system that includes a guidance voice relating to a signal change.

With reference to FIG. 11, although the traffic light that the vehicle will reach during its driving is currently a green traffic light 720, if the controller 407 determines that the vehicle cannot pass through the corresponding signal in consideration of the average speed of the vehicle prior to the light changing to red, it may output a guidance voice such as "Light will change to red in five seconds. Please slow down" via the voice output unit 406.

Meanwhile, when the vehicle is in a stop state, the controller 407 outputs a broadcast via the voice output unit 406 at a certain time before the current signal is changed (e.g., changed to a green signal) for the direction consistent with the guiding direction on the travel route.

Figure 12:
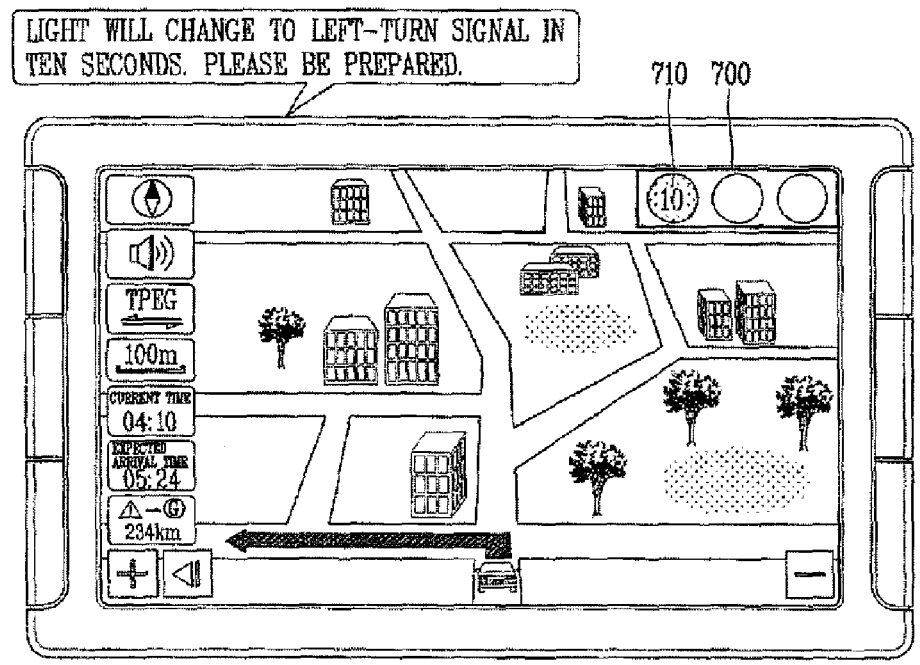
FIGS. 12 and 13 show exemplary information displays for providing information related to a vehicle in a stopped state in an intersection at a red signal.
Figure 13:
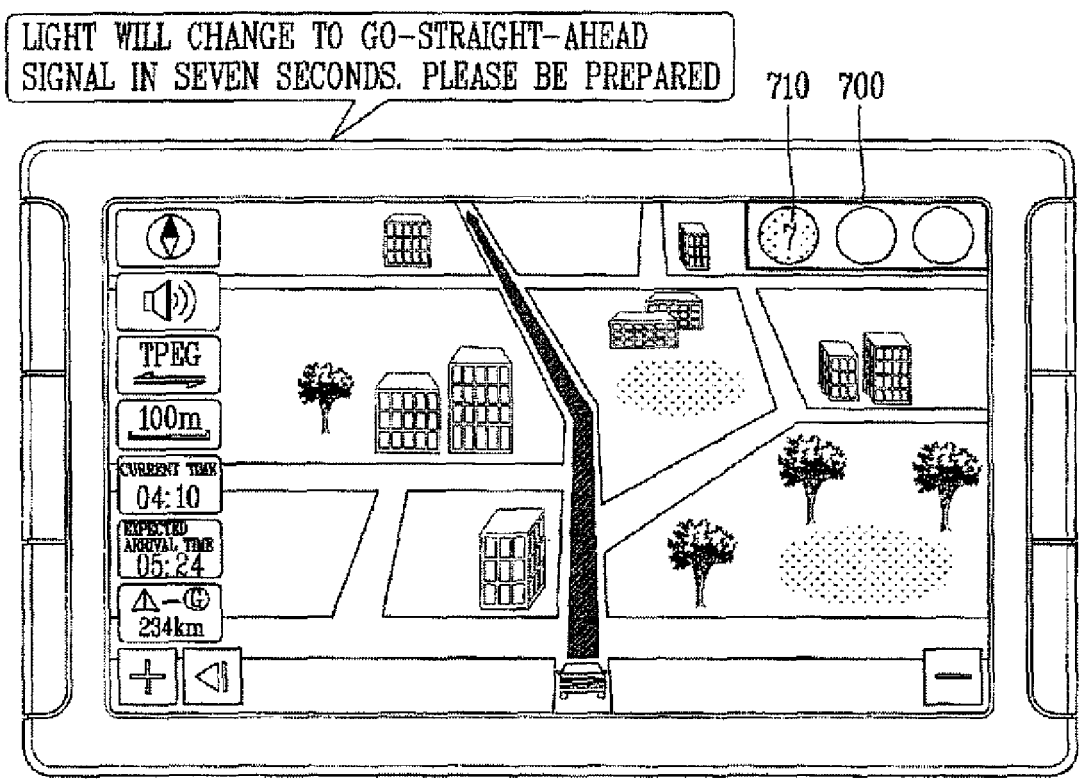

FIGS. 12 and 13 are overviews of a screen display illustrating the vehicle in a stop state at an intersection having a red signal. For example, the controller 407 may output a broadcast such as "Light will change to left-turn sign in ten seconds. Be prepared" at a certain time before the red signal is changed to a left-turn sign, via the voice output unit 406.

Also, the controller 407 may output a broadcast such as 'Light will change to go-straight-ahead signal (green light) in seven seconds. Be prepared' at a certain time before the red signal is changed to the go-straight-ahead signal, via the voice output unit 406.

In the above-mentioned exemplary embodiment, the traffic light information is transmitted by being included in the CTT container of the TPEG congestion traffic information message, but of course, the traffic light information can be included in a different TPEG application and transmitted.

Hereinafter, an information display apparatus and a method thereof according to a first embodiment of the present invention will be described with reference to FIGS. 5, 14 and 15. Here, the information display apparatus and the method thereof according to the first embodiment of the present invention may be applicable to various terminals such as a smart phone, a notebook computer, a personal digital assistant (PDA), a portable multimedia player (PMP) device as well as to the mobile communication terminal 100, the telematics terminal 200, and the navigation apparatus 400.

Figure 14:
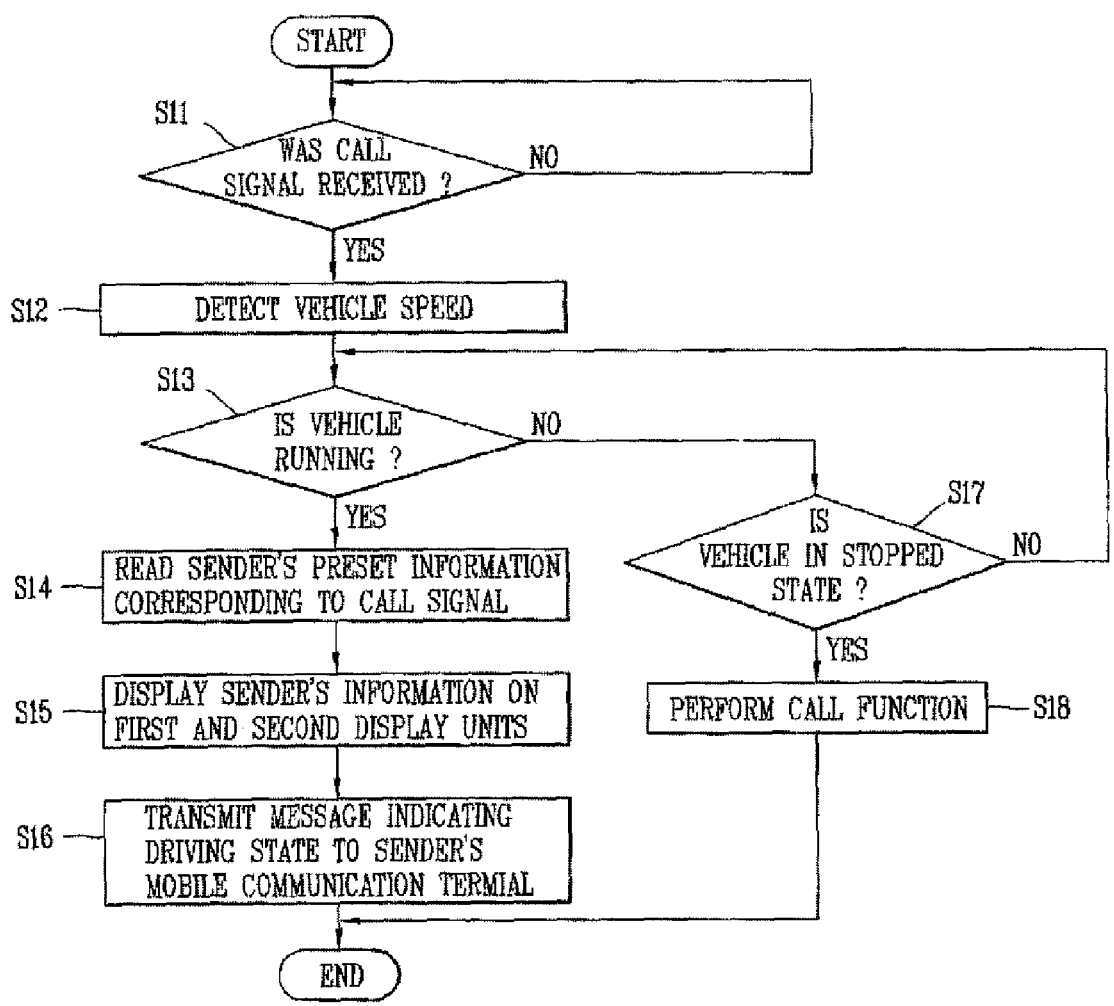
FIG. 14 is a flowchart illustrating an information display method according to a first embodiment of the present invention.

FIG. 14 is a flowchart illustrating an information display method according to a first embodiment of the present invention.

The controller 407 determines whether a incoming communication including a sender's phone number (or other identifier) is received through the communication unit 408 (S11).

When a incoming communication is received through the communication unit 408, the controller 407 detects a vehicle speed (S12). The controller 407 may detect a vehicle speed through GPS data inputted through the GPS module 401, or data inputted from a vehicle speed sensor (not shown) which provides average speed information of a vehicle.

The controller 407 determines whether the vehicle is in a running state or a stopped state based on the vehicle speed (S13). If the vehicle is in a running state, the controller 407 reads, from the storage unit 404, a sender's preset information corresponding to the incoming communication (e.g., at least one of a sender's photo, a sender's name, an image associated with the sender, and an icon indicating reception of the incoming communication) (S14). For instance, if the vehicle is in a running state when the incoming communication is received, the controller 407 reads, from the storage unit 404, a sender's pre-registered photo corresponding to the incoming communication.

If the vehicle is in a running state when the incoming communication is received, the controller 407 outputs a sender's pre-registered information corresponding to the incoming communication on the display unit 405 (first display unit) and the HUD 600 (second display unit). For instance, if the vehicle is in a running state when the incoming communication is received, the controller 407 outputs an image associated with the sender (e.g., a stored photo of the sender), a phone number and a name corresponding to the incoming communication on the display unit 405 (first display unit) and the HUD 600 (second display unit). Here, the HUD 600 displays the sender's information on the windshield of the vehicle (S15). Alternatively, the controller 407 may display a sender's pre-registered information corresponding to the incoming communication on the display unit 405 (first display unit) and the HUD 600 (second display unit). Then, after a predetermined time (e.g., 10 seconds~15 seconds) has lapsed, the controller 407 may not display the sender's pre-registered information corresponding to the incoming communication on the display unit 405 (first display unit) and the HUD 600 (second display unit).

If the vehicle is in a running state when the incoming communication is received, the controller 407 outputs a sender's pre-registered information corresponding to the incoming communication on the display unit 405 (first display unit) and the HUD 600 (second display unit). Then, the controller 407 reads, from the storage unit 404, a pre-registered message indicating that the vehicle is in a running state, and transmits the read message to the sender's mobile communication terminal based on the sender's phone number (S16). Alternatively, if the vehicle is in a running state when the incoming communication is received, the controller 407 outputs a sender's pre-registered information corresponding to the incoming communication on the display unit 405 (first display unit) and the HUD 600 (second display unit). Then, after a predetermined time (e.g., 5 seconds~10 seconds) has lapsed, the controller 407 may automatically disconnect the incoming communication to facilitate safe driving for the driver of the vehicle.

The controller 407 determines whether the vehicle is in a running state or a stopped state based on the vehicle speed (S13). When the vehicle is in a stopped state (S17), the controller 407 performs a call according to a user's request (S18). For instance, if a call button is selected by a user after a incoming communication is received when the vehicle is in a stopped state, the controller 407 may perform connect the call to allow the driver to communicate with the sender.

Figure 15:
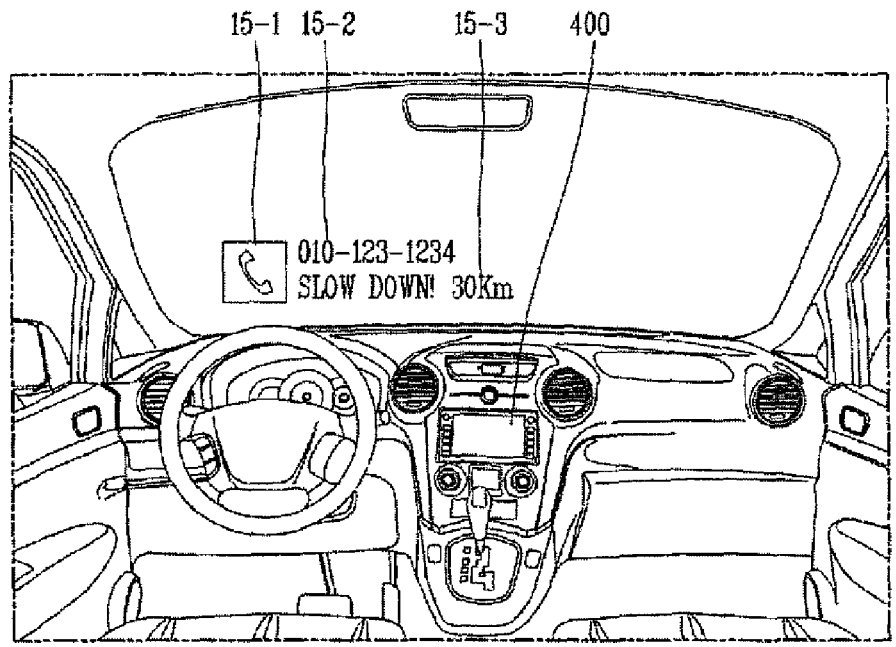
FIG. 15 is an exemplary view illustrating a sender's information displayed on a windshield of a vehicle through a Head Unit Display (HUD) according to a first embodiment of the present invention.

FIG. 15 is an exemplary view illustrating a sender's information displayed on a windshield of a vehicle through a Head Unit Display (HUD) according to a first embodiment of the present invention.

As shown in FIG. 15, if the vehicle is in a running state when the incoming communication is received, the controller 407 displays, on the windshield of the vehicle, through the HUD 600, an icon 15-1 indicating reception of the incoming communication, a sender's phone number 15-2 corresponding to the incoming communication, a sender's name (not shown), and a preset safety speed 15-3 (e.g., Slow down! Safely drive at a speed less than 30 Km per hour).

Figure 16:
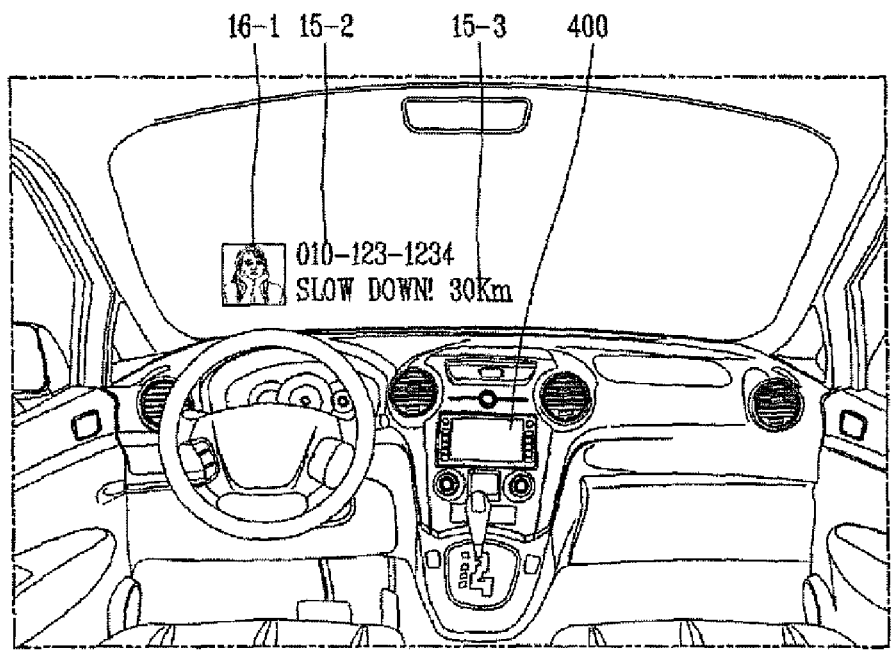
FIG. 16 is an exemplary view illustrating a sender's photo displayed on a windshield of a vehicle through a Head Unit Display (HUD) according to a first to embodiment of the present invention.

FIG. 16 is an exemplary view illustrating a sender's photo displayed on the windshield of the vehicle through the Head Unit Display (HUD) according to the first embodiment of the present invention.

As shown in FIG. 16, if the vehicle is in a running state when the incoming communication is received, the controller 407 may display, on the windshield of the vehicle, through the HUD 600, not only an icon 15-1 indicating reception of the incoming communication, a sender's phone number 15-2 corresponding to the incoming communication, a sender's name (not shown), and a preset safety speed message 15-3 (e.g., Safely drive at a speed less than 30 Km per hour), but also a sender's photo 16-1.

If the vehicle speed is more than a preset speed (e.g., 30 km per hour) when the incoming communication is received, the controller 407 may not display a sender's pre-registered information corresponding to the incoming communication on the display unit 405 (first display unit) and the HUD 600 (second display unit). Rather, the controller 407 may output the sender's pre-registered information corresponding to the incoming communication to the voice output unit 406 to facilitate safe driving. Alternatively, if the vehicle speed is less than a preset speed (e.g., 30 km per hour) when the incoming communication is received, the controller 407 may display the sender's pre-registered information corresponding to the incoming communication on the display unit 405 (first display unit) and the HUD 600 (second display unit).

In the information display apparatus and the method thereof according to the first embodiment of the present invention, if the vehicle is in a running (i.e., driving) state when the incoming communication is received, a sender's information corresponding to the incoming communication is displayed on the windshield of the vehicle through the display unit such as the HUD or the projector. This may allow the user to drive more conveniently and safely.

In the information display apparatus and the method thereof according to the first embodiment of the present invention, if the vehicle is in a running state when the incoming communication is received, a sender's information corresponding to the incoming communication is displayed on the windshield of the vehicle through the display unit such as the HUD or the projector, and then a message indicating that the user is driving is automatically transmitted to the sender's mobile communication terminal. This may allow the user to drive more conveniently and safely.

Hereinafter, an information display apparatus and a method thereof according to a second embodiment of the present invention will be explained with reference to FIGS. 5, 17 to 19. The information display apparatus and the method thereof according to the second embodiment of the present invention may be applied not only to a mobile communication terminal 100, a telematics terminal 200, and a navigation apparatus 400, but also various terminals such as a smart phone, a notebook computer, Personal Digital Assistants (PDA), and a Portable Multimedia Player (PMP) device.

Figure 17:
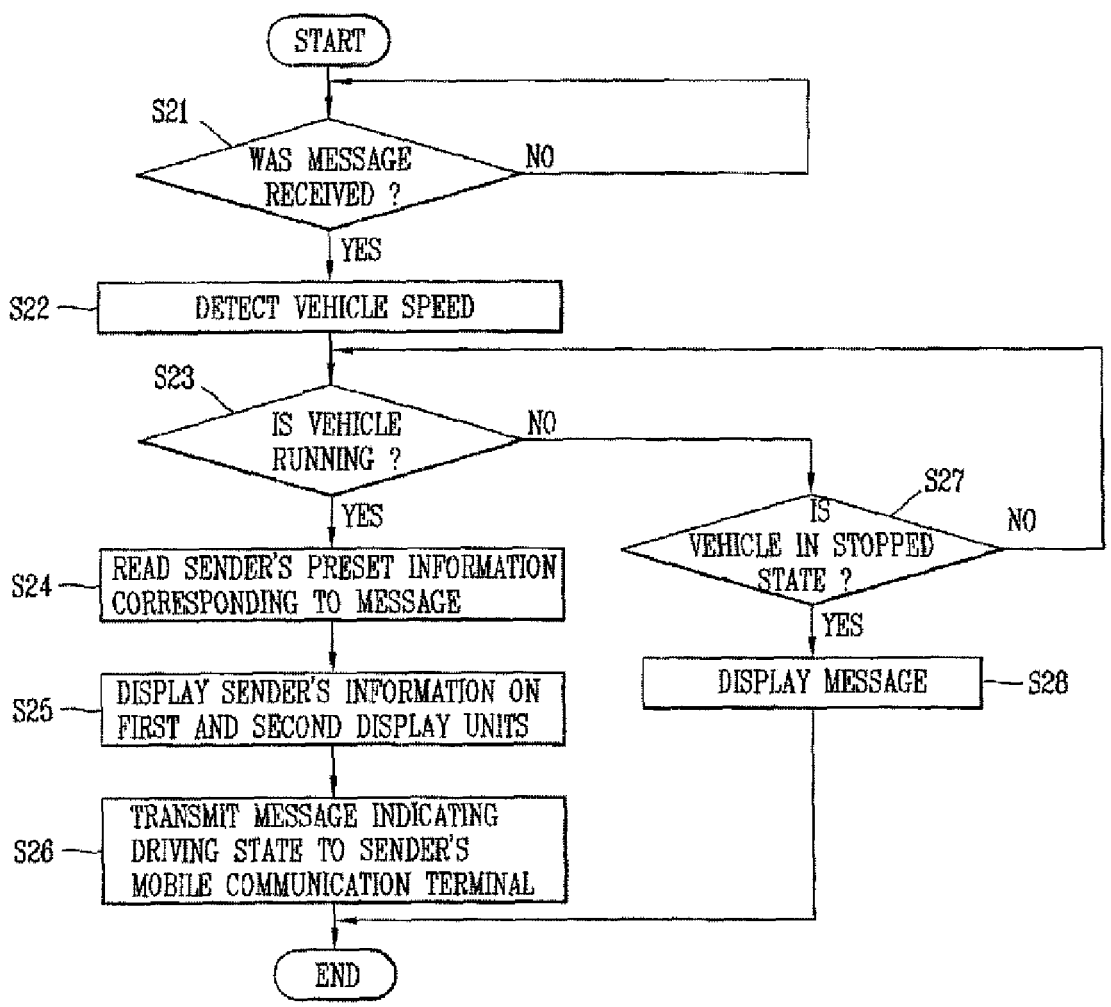
FIG. 17 is a flowchart illustrating an information display method according to a second embodiment of the present invention.

FIG. 17 is a flowchart illustrating an information display method according to a second embodiment of the present invention.

The controller 407 determines whether a message (e.g., an SMS message or an E-mail) including a sender's phone number (or other identifier) is received through the communication unit 408 (S21).

When a message is received through the communication unit 408, the controller 407 detects a vehicle speed (S22). The controller 407 may detect a vehicle speed through GPS data inputted through the GPS module 401, or data inputted from a vehicle speed sensor (not shown) which provides average speed information of a vehicle.

The controller 407 determines whether the vehicle is in a running state or a stopped state based on the vehicle speed (S23). If the vehicle is in a running state, the controller 407 can read, from the storage unit 404, a sender's preset information corresponding to the message (e.g., at least one of a sender's photo, a sender's name, and an icon indicating reception of the message) (S24). For instance, if the vehicle is in a running state when the message is received, the controller 407 reads, from the storage unit 404, a sender's pre-registered photo corresponding to the message.

If the vehicle is in a running state when the message is received, the controller 407 outputs a sender's pre-registered information corresponding to the message on the display unit 405 (first display unit) and the HUD 600 (second display unit). For instance, if the vehicle is in a running state when the message is received, the controller 407 outputs a sender's pre-registered photo, phone number and name corresponding to the message on the display unit 405 (first display unit) and the HUD 600 (second display unit). Here, the HUD 600 displays the sender's information on the windshield of the vehicle (S25).

If the vehicle is in a running state when the message is received, the controller 407 outputs a sender's pre-registered information corresponding to the message on the display unit 405 (first display unit) and the HUD 600 (second display unit). Then, the controller 407 reads, from the storage unit 404, a pre-registered message indicating that the vehicle is in a running state, and transmits the read message to the sender's mobile communication terminal based on the sender's phone number (S26).

The controller 407 determines whether the vehicle is in a running state or a stopped state based on the vehicle speed. When the vehicle is in a stopped state (S27), the controller 407 displays the message according to a user's request (S28). For instance, if a message is received when the vehicle is in a stopped state, the controller 407 may display the received message on the windshield of the vehicle through the HUD 600 (second display unit). As another example, if the message is received when the vehicle is in a driving state, the controller 407 may wait until the vehicle is in a stopped state, and then cause the message to be displayed once the vehicle has reached a stopped state.

Figure 18:
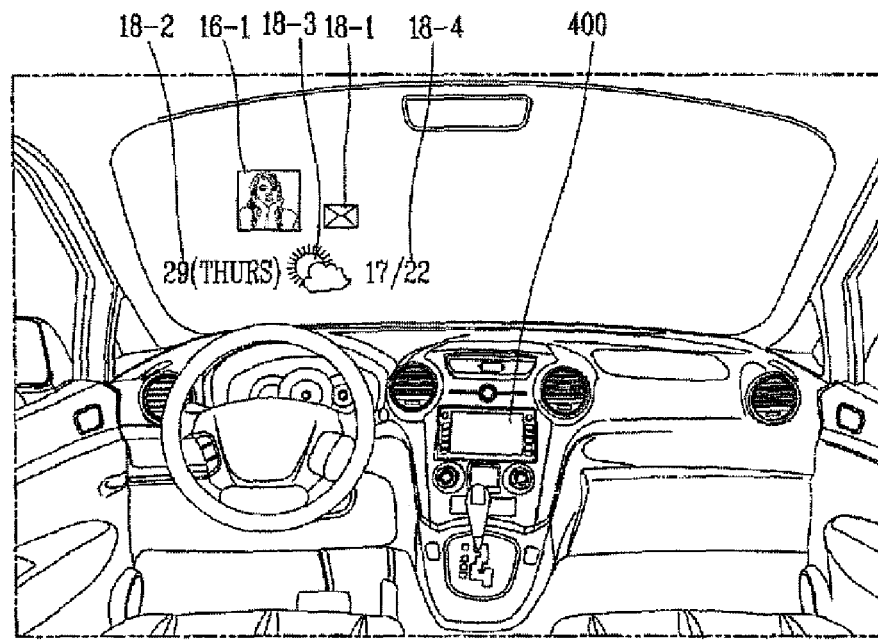
FIG. 18 is an exemplary view illustrating a message displayed on a windshield of a vehicle through a Head Unit Display (HUD) according to a second is embodiment of the present invention.

FIG. 18 is an exemplary view illustrating a message displayed on a windshield of a vehicle through a Head Unit Display (HUD) according to a second embodiment of the present invention.

As shown in FIG. 18, if the vehicle is in a running state when the message is received, the controller 407 displays, on the windshield of the vehicle, through the HUD 600, an icon 18-1 indicating reception of the message, a sender's photo 16-1 corresponding to the message, a sender's phone number corresponding to the message, a sender's name (not shown), and a preset safety speed (e.g., Slow down! Safely drive at a speed less than 30 Km per hour). Alternatively, the controller 407 may display, on the windshield of the vehicle, date information 18-2, weather information 18-3, external and internal temperatures of the vehicle 18-4, etc., through the HUD 600 (second display unit) according to a user's request. In some implementations, more or less information can be displayed. For example, in place of a phone number, an e-mail address or other identifier for the sender can be displayed.

Figure 19:
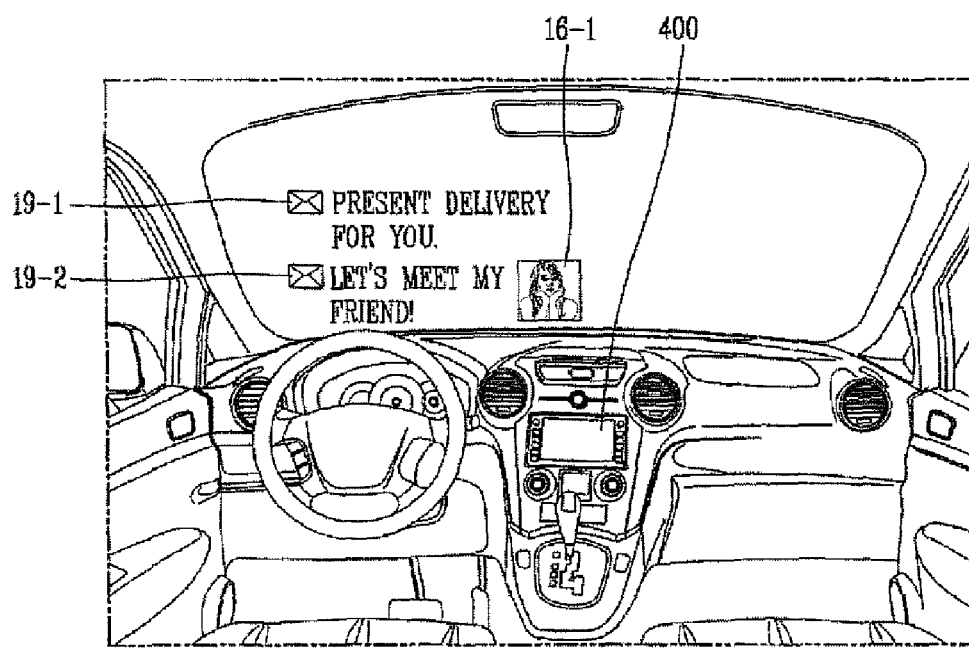
FIG. 19 is an exemplary view illustrating message contents and a sender's photo displayed on a windshield of a vehicle through a Head Unit Display (HUD) according to a second embodiment of the present invention.

FIG. 19 is an exemplary view illustrating message contents and a sender's photo displayed on a windshield of a vehicle through a Head Unit Display (HUD) according to a second embodiment of the present invention.

As shown in FIG. 19, in some implementations, if the vehicle is in a running state when the message is received, the controller 407 may not display the message on the windshield of the vehicle through the HUD 600. However, when the vehicle is in a stopped state, the controller 407 displays, on the windshield of the vehicle, contents of all messages (accumulated messages) 19-1 and 19-2 received while the vehicle was running, through the HUD 600. In some implementations, the messages can be displayed in the order in which they were received. Here, the controller 407 may display each message with a corresponding sender's photo 16-1, on the windshield of the vehicle, through the HUD 600.

In some implementations, if the vehicle speed is more than a preset speed (e.g., 30 km per hour) when the message is received, the controller 407 may not display a sender's pre-registered information corresponding to the message on the display unit 405 (first display unit) and the HUD 600 (second display unit). Rather, the controller 407 may output the sender's pre-registered information corresponding to the message to the voice output unit 406 to facilitate safe driving. Alternatively, if the to vehicle speed is less than a preset speed (e.g., 30 km per hour) when the message is received, the controller 407 may display the sender's pre-registered information corresponding to the message on the display unit 405 (first display unit) and the HUD 600 (second display unit).

In the information display apparatus and the method thereof according to the second embodiment of the present invention, if the vehicle is in a running state when the message is received, a sender's information corresponding to the message is displayed on the windshield of the vehicle through the display unit such as the HUD or the projector. This may allow the user to drive more conveniently and safely.

In the information display apparatus and the method thereof according to the second embodiment of the present invention, if the vehicle is in a running state when the message is received, a sender's information corresponding to the message is displayed on the windshield of the vehicle through the display unit such as the HUD or the projector, and then a message indicating that the user is driving is automatically transmitted to the sender's mobile communication terminal. This may allow the user to drive more conveniently and safely.

In the information display apparatus and the method thereof according to the second embodiment of the present invention, when the vehicle is in a stopped state, contents of a message received while the vehicle was running and/or a sender's information are displayed on the windshield of the vehicle through the display unit such as the HUD or the projector. This may allow the user to check the message more conveniently and safely.

Hereinafter, an information display apparatus and a method thereof according to a third embodiment of the present invention will be explained with reference to FIGS. 5 and 20. The information display apparatus and the method thereof according to the third embodiment of the present invention may be applied not only to a mobile communication terminal 100, a telematics terminal 200, and a navigation apparatus 400, but also various terminals such as a smart phone, a notebook computer, Personal Digital Assistants (PDA), and a Portable Multimedia Player (PMP) device.

Figure 20:
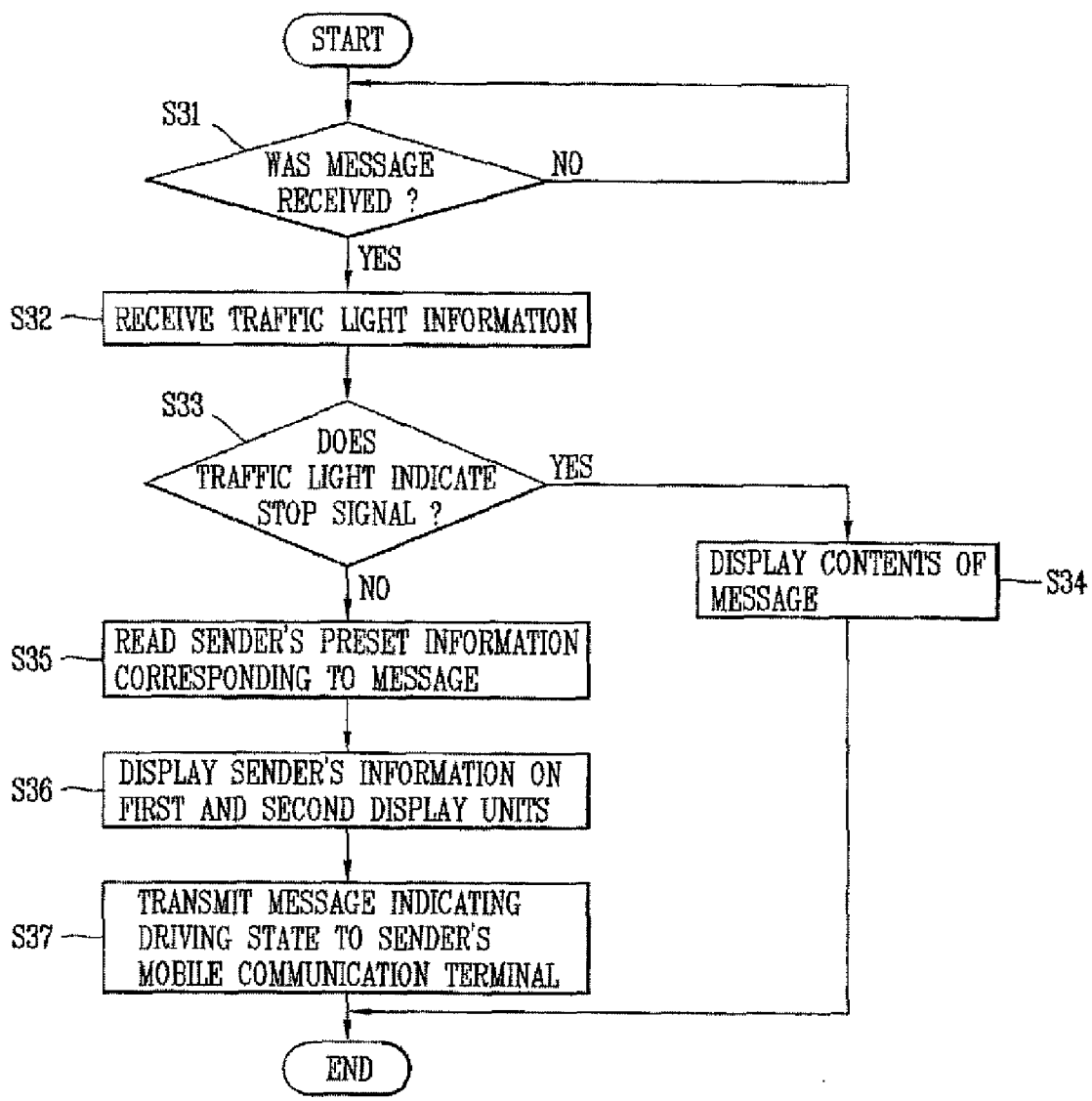
FIG. 20 is a flowchart illustrating an information display method according to a third embodiment of the present invention.

FIG. 20 is a flowchart illustrating an information display method according to a third embodiment of the present invention.

The controller 407 determines whether a message (e.g., an SMS message or an E-mail) including a sender's phone number (or other identifier) is received through the communication unit 408 (S31).

When a message is received through the communication unit 408, the controller 407 receives the traffic light information (S32). The controller 407 may receive the traffic light information from a server (not shown) installed at a traffic light when the vehicle is near the traffic light. Alternatively, the controller 407 may receive the traffic light information from a remote server that is not collocated with the traffic light.

When a message is received through the communication unit 408, the controller 407 determines whether the traffic light indicates stop signal (e.g., red traffic light) (S33). If the traffic light indicates a stop signal, the controller 407 displays contents of the received message on the windshield of the vehicle through the HUD 600 (second display unit) (S34).

On the other hand, if the traffic light indicates a running signal (e.g., green traffic light, left-turn sign, right-turn sign, etc.), the controller 407 reads, from the storage unit 404, a sender's preset information corresponding to the message (e.g., at least one of a sender's photo, a sender's name, and an icon indicating reception of the message) (S35). For instance, if the traffic light indicates a running signal when the message is received, the controller 407 reads, from the storage unit 404, a sender's pre-registered photo corresponding to the message.

If the traffic light indicates a running signal when the message is received, the controller 407 outputs a sender's pre-registered information corresponding to the message on the display unit 405 (first display unit) and the HUD 600 (second display unit). For instance, if the traffic light indicates a running signal when the message is received, the controller 407 outputs a sender's pre-registered photo, phone number and name corresponding to the message on the display unit 405 (first display unit) and the HUD 600 (second display unit). Here, the HUD 600 displays the sender's information on the windshield of the vehicle (S36).

If the traffic light indicates a running signal when the message is received, the controller 407 outputs a sender's pre-registered information corresponding to the message on the display unit 405 (first display unit) and the HUD 600 (second display unit). Then, the controller 407 reads, from the storage unit 404, a pre-registered message indicating that the vehicle is in a running state, and transmits the read message to the sender's mobile communication terminal based on the sender's phone number (S37).

In the information display apparatus and the method thereof according to the third embodiment of the present invention, if the traffic light indicates a running signal when the message is received, a sender's information corresponding to the message is displayed on the windshield of the vehicle through the display unit such as the HUD or the projector. This may allow the user to drive more conveniently and safely.

In the information display apparatus and the method thereof according to the third embodiment of the present invention, if the traffic light indicates a stop signal (e.g., a red light), contents of the received message and/or a sender's information are displayed on the windshield of the vehicle through the display unit such as the HUD or the projector. This may allow the user to check the message more conveniently and safely.

Hereinafter, an information display apparatus and a method thereof according to a fourth embodiment of the present invention will be explained with reference to FIGS. 5 and 21. The information display apparatus and the method thereof according to the fourth embodiment of the present invention may be applied not only to a mobile communication terminal 100, a telematics terminal 200, and a navigation apparatus 400, but also various terminals such as a smart phone, a notebook computer, Personal Digital Assistants (PDA), and a Portable Multimedia Player (PMP) device.

Figure 21:
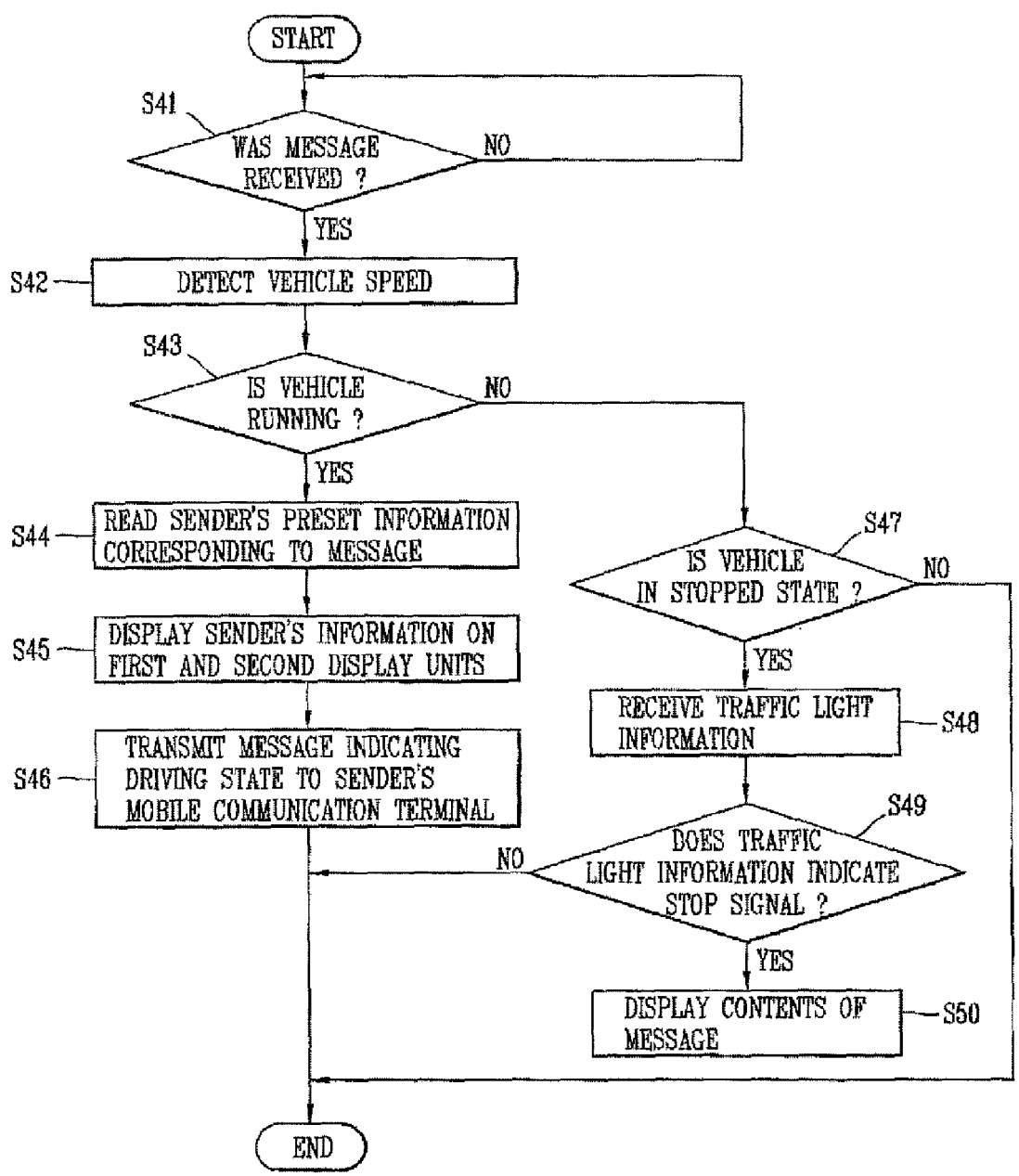
FIG. 21 is a flowchart illustrating an information display method according to a fourth embodiment of the present invention.

FIG. 21 is a flowchart illustrating an information display method according to a fourth embodiment of the present invention.

The controller 407 determines whether a message (e.g., an SMS message or an E-mail) including a sender's phone number (or other identifier) is received through the communication unit 408 (S41).

When a message is received through the communication unit 408, the controller 407 detects a vehicle speed (S42). The controller 407 may detect a vehicle speed through GPS data inputted through the GPS module 401, or data inputted from a vehicle speed sensor (not shown) which provides average speed information of a vehicle.

The controller 407 determines whether the vehicle is in a driving (i.e. running) state or a stopped state based on the vehicle speed (S43). If the vehicle is in a running state, the controller 407 reads, from the storage unit 404, a sender's preset information corresponding to the message (e.g., at least one of a sender's photo, a sender's name, and an icon indicating reception of the message) (S44). For instance, if the vehicle is in a running state when the message is received, the controller 407 reads, from the storage unit 404, a sender's pre-registered photo corresponding to the message.

If the vehicle is in a running state when the message is received, the controller 407 outputs a sender's pre-registered information corresponding to the message on the display unit 405 (first display unit) and the HUD 600 (second display unit). For instance, if the vehicle is in a running state when the message is received, the controller 407 outputs a sender's pre-registered photo, phone number and name corresponding to the message on the display unit 405 (first display unit) and the HUD 600 (second display unit). Here, the HUD 600 displays the sender's information on the windshield of the vehicle (S45).

If the vehicle is in a running state when the message is received, the controller 407 outputs a sender's pre-registered information corresponding to the message on the display unit 405 (first display unit) and the HUD 600 (second display unit). Then, the controller 407 reads, from the storage unit 404, a pre-registered message indicating that the vehicle is in a running state, and transmits the read message to the sender's mobile communication terminal based on the sender's phone number (S46).

The controller 407 determines whether the vehicle is in a running state or a stopped state based on the vehicle speed. If the vehicle is in a stopped state (S47), the controller 407 receives the traffic light information (S48). The controller 407 may receive the traffic light information from a server (not shown) installed at a traffic light when the vehicle is near the traffic light.

When a message is received through the communication unit 408, the controller 407 determines whether the traffic light indicates a stop signal (e.g., red traffic light) (S49).

If the traffic light indicates a stop signal, the controller 407 displays contents of the received message on the windshield of the vehicle through the HUD 600 (second display unit) (S50).

If time taken for the stop signal to change to a running signal is longer than a predetermined time (e.g., 10 seconds), the controller 407 may display contents of the message on the windshield of the vehicle through the HUD 600. On the other hand, if time taken for the stop signal to change to a running signal is shorter than a predetermined time (e.g., 10 seconds), the controller 407 may not display contents of the message.

In the information display apparatus and the method thereof according to the fourth embodiment of the present invention, if the vehicle is in a stopped state when the message is received, contents of a message received while the vehicle was in a driving state are displayed on the windshield of the vehicle through the display unit such as the HUD or the projector. This may allow the user to check the message more conveniently and safely.

In the information display apparatus and the method thereof according to the fourth embodiment of the present invention, if time taken for the stop signal to change to a running signal is longer than a predetermined time (e.g., 10 seconds), contents of a message received while the vehicle was in a driving state are displayed on the windshield of the vehicle through the display unit such as the HUD or the projector. This may allow the user to check the message more conveniently and safely.

The information display apparatus according to the present invention may have therein the HUD or the projector. And, techniques based on the information display apparatus and method of the present invention may be implemented by the HUD or the projector. Here, the HUD or the projector may include all the components of the information display apparatus according to the present invention.

As aforementioned, in the information display apparatus and the method thereof according to the present invention, if the vehicle is in a running state when a incoming communication is received, a sender's information corresponding to the incoming communication is displayed on the windshield of the vehicle through the display unit such as the HUD or the projector. This may allow the user to drive more conveniently and safely.

In the information display apparatus and the method thereof according to the present invention, if the vehicle is in a running state when a incoming communication is received, a sender's information corresponding to the incoming communication is displayed on the windshield of the vehicle through the display unit such as the HUD or the projector, and then a message indicating that the user is driving is automatically transmitted to the sender's mobile communication terminal. This may allow the user to drive more conveniently and safely.

In the information display apparatus and the method thereof according to the present invention, if the vehicle is in a running state when a message is received, a sender's information corresponding to the message is displayed on the windshield of the vehicle through the display unit such as the HUD or the projector. This may allow the user to drive more conveniently and safely.

In the information display apparatus and the method thereof according to the present invention, if the vehicle is in a running state when a message is received, a sender's information corresponding to the message is displayed on the windshield of the vehicle through the display unit such as the HUD or the projector, and then a message indicating that the user is driving is automatically transmitted to the sender's mobile communication terminal. This may allow the user to drive more conveniently and safely.

In the information display apparatus and the method thereof according to the present invention, if the traffic light indicates a running signal when a message is received, text, such as "contents of a message received while the vehicle was running and/or a sender's information" are displayed on the windshield of the vehicle through the display unit such as the HUD or the projector. This may allow the user to check the message more conveniently and safely.

In the information display apparatus and the method thereof according to the present invention, if the traffic light indicates a running signal when a message is received, a sender's information corresponding to the message is displayed on the windshield of the vehicle through the display unit such as the HUD or the projector. This may allow the user to drive more conveniently and safely.

In the information display apparatus and the method thereof according to the present invention, if the traffic light indicates a stop signal, contents of a received message and/or a sender's information are displayed on the windshield of the vehicle through the display unit such as the HUD or the projector. This may allow the user to check the message more conveniently and safely.

In the information display apparatus and the method thereof according to the present invention, if the vehicle is in a stopped state when a message is received, a message received while the vehicle was running is displayed on the windshield of the vehicle through the display unit such as the HUD or the projector. This may allow the user to check the message more conveniently and safely.

In the information display apparatus and the method thereof according to the present invention, if it is determined, when a message is received, that time taken for the stop signal to change to a running signal is longer than a predetermined time, a message received while the vehicle was running is displayed on the windshield of the vehicle through the display unit such as the HUD or the projector. This may allow the user to check the message more conveniently and safely.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to acquire additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for providing an indication of an incoming communication to a user of a vehicle, comprising:
   receiving an indication of an incoming communication;
   accessing speed information at least in part enabling determination of a current speed of the vehicle;
   determining a current speed of the vehicle using the accessed speed information;
   accessing a threshold speed;
   comparing the current speed of the vehicle to the threshold speed;
   determining whether the current speed of the vehicle is above or below the threshold speed;
   presenting information related to the incoming communication to the user of the vehicle in a first manner if it is determined that the current speed of the vehicle is below the threshold speed; and
   presenting information related to the incoming communication to the user of the vehicle in a second manner, that differs from the first manner, if it is determined that the current speed of the vehicle is equal to or above the threshold speed.

2. The method of claim 1, wherein presenting in the first manner leverages a different output device than presenting in the second manner.

3. The method of claim 2, wherein presenting information related to the incoming communication to the user of the vehicle in the first manner includes visually displaying information associated with the incoming communication to the user of the vehicle; and
   wherein presenting information related to the incoming communication to the user of the vehicle in the second manner includes communicating information associated with the incoming communication to the user of the vehicle using an audio device.

4. The method of claim 3, wherein visually displaying information associated with the incoming communication to the user of the vehicle includes displaying a telephone number, a name, and art image associated with a person that initiated the incoming communication.

5. The method of claim 1, further comprising:
determining a driving state of the vehicle, using the accessed speed information;
accessing a response message stored within a memory; and
providing the response message to a source that initiated the incoming communication responsive to the determination made about the driving state of the vehicle.

6. The method of claim 5, wherein the response message is provided to the source that initiated the incoming communication responsive to determining that the driving state of the vehicle is a moving state.

7. The method of claim 5, wherein the response message includes information relating to an interruption of delivery of the incoming communication based on at least one of a speed of the vehicle, a driving state of the vehicle, weather information, a location of the vehicle, and traffic information.

8. The method of claim 1, further comprising:
determining a driving state of the vehicle, using the accessed speed to information;
wherein presenting information related to the incoming communication to the user of the vehicle in the first manner includes:
providing information related to the incoming communication to the user of the vehicle in a first configuration if it is determined that the driving is state of the vehicle is a stopped state; and
providing information related to the incoming communication to the user of the vehicle in a second configuration if it is determined that the driving state of the vehicle is a moving state.

9. The method of claim 8, wherein providing in the first configuration includes connecting a voice call.

10. The method of claim 1, wherein the threshold speed is determined based on one or more of, speed limit information, traffic information, weather information, and temperature information.

11. The method of claim 1, wherein the threshold speed is set by the user of the vehicle.

12. A system for providing an indication of an incoming communication to a user of a vehicle, comprising:
a wireless communication unit configured to receive an indication of an incoming communication;
speed determination unit configured to determine speed information for the a vehicle and a current speed for the vehicle;
a threshold speed determination module configured to determine a threshold speed;
a speed comparator configured to compare the current speed of the vehicle to the threshold speed and to determine whether the current speed of the vehicle is above or below the threshold speed;
a first output device configured to present information related to the incoming communication to the user of the vehicle in a first manner if it is determined that the current speed of the vehicle is below the threshold speed; and
a second output device configured to present information related to the incoming communication to the user of the vehicle in a second manner, that differs from the first manner, if it is determined that the current speed of the vehicle is equal to or above the threshold speed.

13. The system of claim 12, wherein the first and second output device are the same output device, wherein presenting in the first manner includes visually displaying information related to the incoming communication, and wherein presenting in the second manner includes visually displaying different information or a different amount of information than presenting in the first manner.

14. The system of claim 12, wherein the first output device is a visual output device configured to visually display information associated with the incoming communication to the user of the vehicle; and
wherein the second output device is an audio device configured to audibly communicate information associated with the incoming communication to the user of the vehicle.

15. The system of 14, wherein presenting in the first manner includes displaying a telephone number, a name, and an image associated with a person that initiated the incoming communication.

16. The system of claim 12, further comprising:
a driving state identifier configured to determine a driving state of the vehicle, using the accessed speed information; and
a memory for storing a response message;
wherein the wireless communication unit is further configured to provide the response message to a source that initiated the incoming communication responsive to the driving state identifier determining that the driving state of the vehicle is a moving state.

17. The system of claim 16, wherein the response message includes information relating to an interruption of delivery of the incoming communication based on at least one of a speed of the vehicle, a driving state of the vehicle, weather information, a location of the vehicle, and traffic information.

18. The system of claim 12, further comprising:
driving state identifier configured to determine a driving state of the vehicle, using the accessed speed information;
wherein the first output device is further configured to:
provide information related to the incoming communication to the user of the vehicle in a first configuration if it is determined that the driving is state of the vehicle is a stopped state; and
provide information related to the incoming communication to the user of the vehicle in a second configuration if it is determined that the driving state of the vehicle is a moving state.

19. The system of claim 18, wherein providing in the first configuration includes connecting a voice call.

20. The system of claim 12, wherein the threshold speed determination module determines the threshold speed based on one or more of, speed limit information, traffic information, weather information, and temperature information.

21. A system for providing an indication of an incoming communication to a user of a vehicle, comprising:
a wireless communication unit configured to receive an indication of an incoming communication;
speed determination unit configured to determine speed information for the a vehicle and a current speed for the vehicle;
a threshold speed determination module configured to determine a threshold speed;

a speed comparator configured to compare the current speed of the vehicle to the threshold speed and to determine whether the current speed of the vehicle is above or below the threshold speed;

means for presenting information related to the incoming communication to the user of the vehicle in a first manner if it is determined that the current speed of the vehicle is below the threshold speed and presenting information related to the incoming communication to the user of the vehicle in a second manner, that differs from the first manner, if it is determined that the current speed of the vehicle is equal to or above the threshold speed.

* * * * *